US012792357B2

(12) United States Patent
Miftakhutdinov et al.

(10) Patent No.: US 12,792,357 B2
(45) Date of Patent: Nov. 10, 2026

(54) CONDITIONAL INSTRUCTION PREDICTION WITH MULTIPLE BIAS TABLES

(71) Applicant: Apple Inc., Cupertino, CA (US)

(72) Inventors: Rustam Miftakhutdinov, Hillsboro, OR (US); Muawya M. Al-Otoom, Lake Oswego, OR (US); Ilhyun Kim, Portland, OR (US); Niket K. Choudhary, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/920,292

(22) Filed: Oct. 18, 2024

(65) Prior Publication Data

US 2026/0086812 A1 Mar. 26, 2026

Related U.S. Application Data

(60) Provisional application No. 63/697,902, filed on Sep. 23, 2024.

(51) Int. Cl.
*G06F 9/38* (2018.01)
*G06F 9/30* (2018.01)

(52) U.S. Cl.
CPC ........ *G06F 9/3844* (2013.01); *G06F 9/30145* (2013.01); *G06F 9/3861* (2013.01)

(58) Field of Classification Search
CPC .................................................... G06F 9/3844
See application file for complete search history.

(56) References Cited

U.S. PATENT DOCUMENTS 5,926,634 A * 7/1999 Isaman ................. G06F 9/3844 712/239
10,318,304 B2 6/2019 Manoukian
(Continued)

FOREIGN PATENT DOCUMENTS

CN 102160033 A 8/2011
CN 111078295 A 4/2020
(Continued)

OTHER PUBLICATIONS

International Search Report and Written Opinion in PCT Appl. No. PCT/US2025/045773 mailed Jan. 13, 2026, 10 pages.

*Primary Examiner* — Michael J Metzger
(74) *Attorney, Agent, or Firm* — Kowert, Hood, Munyon, Rankin & Goetzel, P.C.; Mark D. Seegers; Dean M. Munyon

(57) ABSTRACT

In an embodiment, a computer system includes a processor having prediction circuitry configured to provide a bias prediction as to whether a conditional instruction is biased to a particular outcome that affects a control flow for the conditional instruction. The prediction circuitry accesses a plurality of tables to obtain bias indications for the conditional instruction, the bias indications corresponding to states in an acyclic state machine and the plurality of tables being subject to destructive aliasing that permits multiple conditional instructions to map to a same entry within a table. The prediction circuitry may detect a conflict in which the bias indications include different bias indications for the conditional instruction. The prediction circuitry may provide the bias prediction based on a resolution of the conflict that is determined based on a relative ordering of particular states in the acyclic state machine that correspond to the different bias indications.

20 Claims, 13 Drawing Sheets

(56) References Cited

U.S. PATENT DOCUMENTS

| | | | | |
|---|---|---|---|---|
| 10,423,422 | B2 | 9/2019 | Soundararajan et al. | |
| 2009/0198921 | A1 * | 8/2009 | Chen | G06F 9/3848 711/E12.001 |
| 2017/0153894 | A1 * | 6/2017 | Hornung | G06F 9/3806 |
| 2018/0101385 | A1 | 4/2018 | Wang et al. | |
| 2018/0173533 | A1 * | 6/2018 | Soundararajan | G06F 9/3854 |
| 2019/0004803 | A1 | 1/2019 | Al Sheikh | |
| 2019/0004805 | A1 * | 1/2019 | Al Sheikh | G06F 9/3806 |
| 2020/0110615 | A1 | 4/2020 | Ishii et al. | |
| 2022/0113976 | A1 | 4/2022 | Kothinti Naresh et al. | |
| 2022/0121446 | A1 | 4/2022 | McDonald | |
| 2023/0195467 | A1 | 6/2023 | Bouzguarrou et al. | |
| 2023/0244494 | A1 * | 8/2023 | Kountanis | G06F 9/3806 712/240 |
| 2024/0135116 | A1 | 4/2024 | Vu et al. | |
| 2025/0068939 | A1 * | 2/2025 | Bouzguarrou | G06N 5/022 |

FOREIGN PATENT DOCUMENTS

| | | | |
|---|---|---|---|
| CN | 115686639 | A | 2/2023 |
| CN | 117130665 | A | 11/2023 |
| JP | 2013058135 | A | 3/2013 |
| TW | 201905683 | A | 2/2019 |
| TW | 202105177 | A | 2/2021 |

* cited by examiner

| Table A | Table B | Selected Outcome |
|---|---|---|
| Initial State | Initial State | Initial State |
| Bias Not-Taken State | Bias Not-Taken State | Bias Not-Taken State |
| Bias Taken State | Bias Taken State | Bias Taken State |
| Non-Bias State | Non-Bias State | Non-Bias State |
| Bias Taken State | Bias Not-Taken State | Initial State |
| Initial State | Bias Not-Taken State | Initial State |
| Initial State | Bias Taken State | Initial State |
| Initial State | Non-Bias State | Initial State |
| Bias Not-Taken State | Non-Bias State | Bias Not-Taken State |
| Bias Taken State | Non-Bias State | Bias Taken State |

*FIG. 6*

CONDITIONAL INSTRUCTION PREDICTION WITH MULTIPLE BIAS TABLES

PRIORITY CLAIM

The present application claims priority to U.S. Provisional Appl. No. 63/697,902, filed Sep. 23, 2024, which is incorporated by reference herein in its entirety.

BACKGROUND

Technical Field

This disclosure relates generally to integrated circuits and, more specifically, to various mechanisms for handling aliasing in prediction circuitry.

Description of the Related Art

Modern computer systems usually include one or more processors that serve as central processing units that execute control software (e.g., an operating system) and applications that provide user functionality. The processors may implement mechanisms that attempt to improve their performance. One mechanism is a conditional branch prediction circuit (also referred to as a "conditional branch predictor") that attempts to predict whether the condition of a conditional branch (also referred to as a "conditional branch instruction") is true or false. In particular, when a processor encounters a conditional branch, it must decide which execution path to follow based on the condition's outcome. In order to avoid delays caused by waiting for the condition to be evaluated, the processor may use a prediction from the conditional branch prediction circuit to guess the likely outcome and speculatively fetch instructions from a target address. But if that conditional branch is mispredicted, then the speculative work must be discarded and the processor has to fetch instructions from the correct target address for execution, incurring a delay. As a result, the accuracy of these predictions plays an important role in the performance of processors.

BRIEF DESCRIPTION OF THE DRAWINGS

FIG. 6 is a table diagram illustrating an example table of selected state outcomes based on different combinations of states read from two tables.

DETAILED DESCRIPTION

Figure 1:
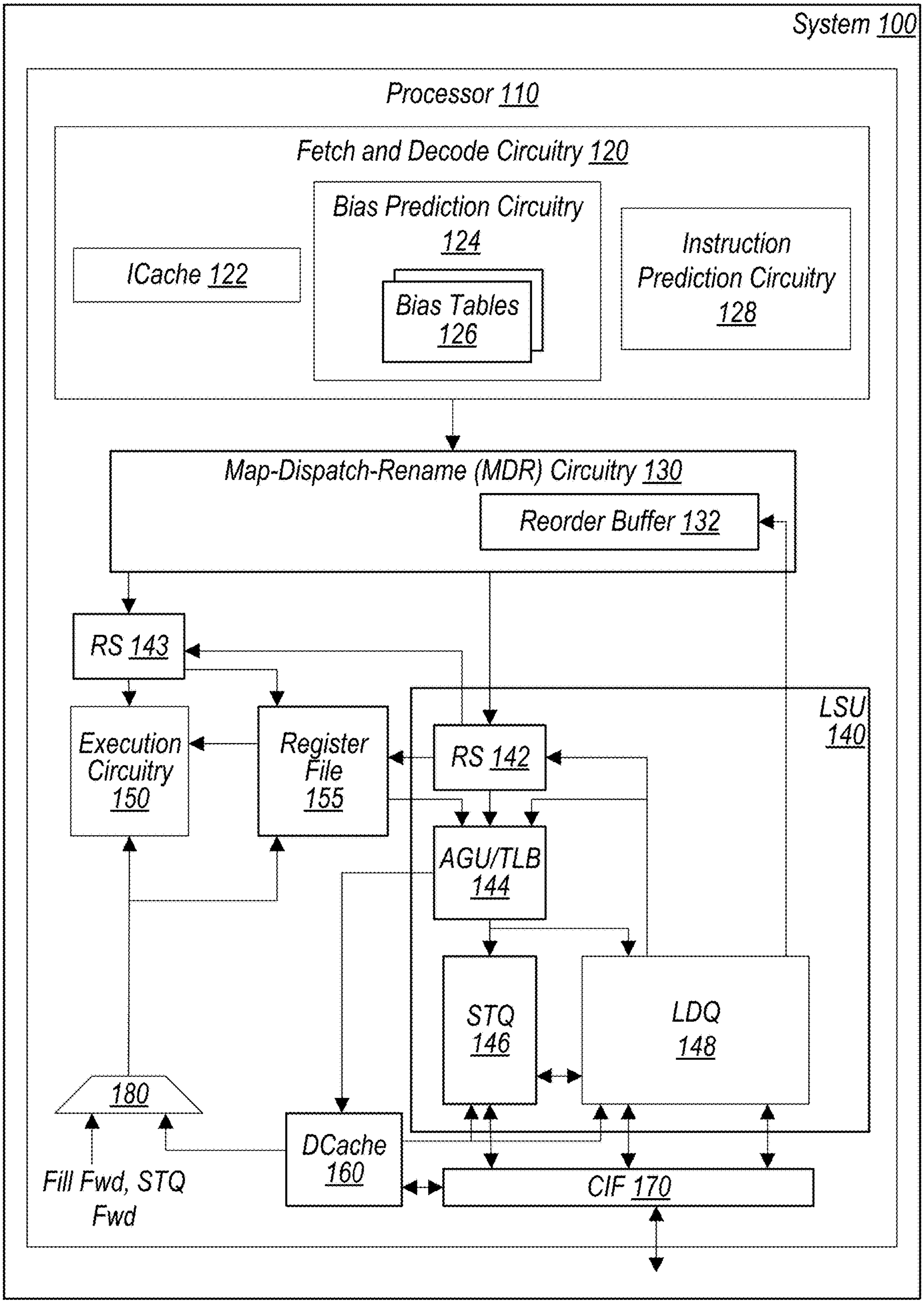
FIG. 1 is a block diagram illustrating one embodiment of a system having a processor that includes bias prediction circuitry with bias tables.

The execution of code involving a conditional instruction depends on the outcome of the condition of that conditional instruction. Conditional instructions can include conditional branch instructions, conditional move instructions, etc. When the condition of a conditional branch instruction is true, a first instruction from a first target address may be fetched and executed. Conversely, when the condition is false, a second instruction from a second target address may be fetched and executed. As used herein, the phrase "a conditional instruction is taken" refers to the case in which the condition of the conditional instruction is true (and thus, in the case of a conditional branch instruction, the branch is taken). Likewise, the phrase "a conditional instruction is not taken" refers to the case in which the condition of the conditional instruction is false (and the branch is not taken in the case of a conditional branch instruction). The terms "taken" and "true" are used interchangeably with respect to a conditional instruction, and the terms "not taken" and "false" are used interchangeably.

A processor can include multiple predictors that produce a prediction as to whether the condition of a conditional instruction will evaluate to true or false prior to the (actual) execution of that conditional instruction. One of those predictors may be a "conditional bias predictor." In various embodiments, this bias prediction circuitry is configured to produce a prediction as to whether a conditional instruction is biased taken/true, biased not taken/false, or non-biased. A conditional instruction being biased refers to the case where the condition of the conditional instruction is always true or always false—the term "always" in this context does not refer to "at all times" and "for all workloads" but rather refers to "during the current tracking interval" (that is, since the last bias reset). For example, if the condition always evaluates to true during the current tracking interval, then the conditional instruction is considered biased true. Thus, when a conditional instruction is predicted to be biased true (or biased false), it means that the condition is predicted to be always true (or always false) and thus the conditional instruction is presumed to behave always one way (or another). When the conditional instruction is biased true or false, an evaluation of the instruction's condition that equals the opposite state (e.g., the condition evaluates to true but the instruction is biased false) causes the conditional instruction to become non-biased. The biases for tracked conditional instructions may be reset (e.g., after a certain number of instructions have become non-biased) to an initial state where a conditional instruction's bias is unknown until an initial evaluation of its condition determines its bias for the new tracking interval.

When the conditional instruction is predicted to be biased taken or not taken, fetch and decode circuitry may use that bias prediction (over a prediction from another predictor) to process the conditional instruction. Conventionally, this bias prediction circuitry uses a single table that is indexed by a hash function to store state information (e.g., a bias taken value, a bias not-taken value, etc.) about a conditional instruction. When this table is implemented as a tagless single way, it is subject to destructive aliasing in the case where multiple conditional instructions with different behaviors index to the same table entry owing to hash collisions. As a result, the bias prediction circuitry can produce an inaccurate prediction for a first conditional instruction due to the prediction being based on the state information that is stored for a second instruction.

One approach to reducing destructive aliasing is to add associativity to the table, which allows multiple ways to store distinct entries for a given index. But adding associativity comes at the cost of adding tag storage to distinguish the ways, and adding tag storage to the prediction circuitry results in performance/size penalties (e.g., timing and power costs). Another approach to addressing destructive aliasing is to replace the one table with three (or some other odd number greater than one) tables, with each table being indexed by a respective hash function. When the tables are read to produce a prediction, the bias prediction circuitry selects the state that is the result of a majority "vote" among the states read—e.g., if two tables indicate a bias taken state and one table indicates a non-bias state, then the prediction is produced based on the bias taken state. This approach, however, requires at least three tables to address destructive aliasing. This disclosure addresses, among other things, the problem of how to address destructive aliasing in a more storage-efficient way that overcomes one or more of the above deficiencies.

In various embodiments described below, a system comprises one or more processors that include prediction circuitry that is configured to provide a bias prediction as to whether a conditional instruction is biased to a particular outcome (taken or not taken) that affects a control flow for the conditional instruction. In various embodiments, the prediction circuitry includes two tables that are indexed by different hash functions. When there is no destructive aliasing, the prediction circuitry reads the same state (e.g., a bias taken state) from the tables and provides a prediction based on that state. But when destructive aliasing occurs, different states are read from the tables and the prediction circuitry implements a policy to resolve the conflict resulting from the conflicting states. In various embodiments, the prediction circuitry resolves the conflict based on a relative ordering of the states in an acyclic state machine.

There may be four states associated with a given conditional instruction: an initial state, a bias taken state, a bias not taken state, and a non-bias state—the states are discussed in greater detail below. A conditional instruction may begin in the initial state and progress to either the bias taken state or the bias not-taken state and end at the non-bias state from one of those two states. These four states and the flow from the initial state to the non-bias state through either the bias taken state or the bias not-taken state may allow the prediction circuitry to determine the correct state for a conditional instruction when there is destructive aliasing. To resolve the conflict that results from conflicting states being read from the tables, the prediction circuitry may select the state that is more upstream in the state machine than the other state(s). For example, if the non-bias state and the bias taken state are read from the tables, then the prediction circuitry may produce a bias prediction based on the bias taken state. If neither state is more upstream than the other state in the acyclic state machine, then the prediction circuitry may provide the bias prediction based on another state that is more upstream in the acyclic state machine than the conflicting states. Based on the provided bias prediction, the conditional instruction may be recoded and then executed by execution circuitry of the one or more processors. To recode the conditional instruction, the machine code of the instruction line that includes the conditional instruction may be embedded with the prediction(s) for the conditional instruction—the recoding may result in the conditional instruction becoming a non-conditional instruction.

These techniques may be advantageous over prior approaches as the techniques address destructive aliasing in a more storage-efficient way. In particular, these techniques may utilize only two tables instead of using at least three tables in a majority vote approach. Furthermore, utilizing only two tables without associativity can involve less circuitry than adding associativity to a single table. As a result, the effects of destructive aliasing can be addressed while not incurring the additional costs of other approaches (e.g., more required die space to implement the circuitry of the other approaches, higher power cost to drive that larger and complex circuitry, etc.). Accordingly, the disclosed techniques improve the functioning of a computer system and provide an improvement to the field of computer architecture.

Turning now to FIG. 1, a block diagram of a system 100. In the illustrated embodiment, system 100 comprises a processor 110 having fetch and decode circuitry 120, map-dispatch-rename (MDR) circuitry 130, load/store circuitry (LSU) 140, a set of reservation stations (RSs) 142 and 143, execution circuitry 150, a register file 155, a data cache, or "DCache", 160, and core interface circuitry (CIF) 170. Also as shown, fetch and decode circuitry 120 includes an instruction cache, or "ICache", 122, bias prediction circuitry 124 (having bias tables 126), and instruction prediction circuitry 128. Further, fetch and decode circuitry 120 is coupled to MDR circuitry 130, which includes a reorder buffer 132 and is coupled to RS 142 in LSU 140 and RS 143. RS 143 is coupled to execution circuitry 150, and reorder buffer 132 is coupled to a load queue (LDQ) 148 in LSU 140. Register file 155 is coupled to execution circuitry 150 and LSU 140 (particularly, to RS 142 and an address generation unit/translation lookaside buffer (AGU/TLB) 144). AGU/TLB 144 is coupled to DCache 160, which is coupled to CIF 170 and a multiplexor 180 that is coupled to execution circuitry 150 and register file 155. Another input of multiplexor 180 is coupled to receive other data (e.g., fill forward data from CIF 170 and/or forward data from a store queue 146 (STQ 146) in LSU 140. DCache 160 is coupled to STQ 146 and LDQ 148 in LSU 140. AGU/TLB 144 is coupled to RS 142, STQ 146, and LDQ 148. STQ 146 is coupled to LDQ 148, both of which are coupled to CIF 170.

System 100 may be any hardware-based system, such as a desktop computer, a laptop computer, a tablet computer, a cellular or mobile phone, etc. Examples of types of systems that may correspond to system 100 are discussed in more detail with respect to FIG. 12. It is noted that the number of components of system 100 (and also the number of subcomponents for those shown in FIG. 1) may vary between embodiments. Accordingly, there can be more or fewer of each component or subcomponent than the number shown in FIG. 1. For example, system 100 may include multiple processors 110, memory controllers, memory, peripheral circuits, power management circuits, etc.

In various embodiments, system 100 integrates many components (e.g., processor 110, memory controller circuits, agent circuits, etc.) onto one or more integrated circuit dies that are integrated into a single package. System 100 may be a multi-die system in which the hardware hides the fact that there are multiple dies from software (e.g., by ensuring latencies are low and keeping power states synchronized)—that is, the integrated circuit dies can be configured as a single system in which the existence of multiple dies is transparent to software that is executing on that system. But in some embodiments, the components of system 100 are implemented on two or more discrete chips in system 100.

Processor 110, in various embodiments, comprises any circuitry and/or microcode that is configured to execute instructions defined in an instruction set architecture implemented by processor 110. Processor 110 may encompass discrete microprocessors, processors and/or microprocessors integrated into multichip module implementations, processors implemented as multiple integrated circuits, etc. In various embodiments, processor 110 executes the main control software of the system, such as an operating system. Generally, software executed by processor 110 during use controls the other components of system 100 to realize the desired functionality of the system. Processor 110 may also execute other software, such as application programs. An application program may provide user functionality and rely on the operating system for lower-level device control, scheduling, memory management, etc. Processor 110 may also be referred to as application processors.

In various embodiments, processor 110 is part of a processor complex that includes one or more processors 110 that serve as a CPU of system 100. The processor complex may include other hardware such as an L2 cache and/or an interface to the other components of system 100 (e.g., an interface to a communication fabric that couples the processor complex to a memory controller). Processor 110 may fetch instructions and data from a memory as a part of executing load instructions and store the fetched instructions and data in caches of the processor complex. In various embodiments, processor 110 shares a common last level cache (e.g., an L2 cache) with other processors while including its own caches (e.g., an L0 cache, an L1 cache, etc.) for storing instructions and data. Processor 110 can retrieve instructions and data (e.g., from the caches) and execute those instructions (e.g., conditional branch instructions, ALU instructions, etc.) to perform operations that involve the data. Processor 110 may then write a result of the operations back to the memory.

Fetch and decode circuitry 120, in various embodiments, is circuitry that is configured to fetch instructions and decode them into instructions operations ("ops") for execution. More particularly, fetch and decode circuitry 120 may be configured to cache instructions in ICache 122 that are fetched through CIF 170. Fetch and decode circuitry 120 may fetch a speculative path of instructions and implement prediction structures (e.g., bias prediction circuitry 124 and instruction prediction circuitry 128) for predicting the path. In various embodiments, fetch and decode circuitry 120 may decode an instruction into multiple ops, depending on the complexity of the instruction. Particularly complex instructions may be microcoded. In such embodiments, the microcode routine for an instruction may be coded in ops. But in other embodiments, each instruction in the instruction set architecture implemented by processor 110 may be decoded into a single op and thus op can be synonymous with instruction (although it may be modified in form by the decoder).

ICache 122 and DCache 160, in various embodiments, may each be a cache having any desired capacity, cache line size, and configuration. A cache line may be allocated/deallocated in a cache as a unit and thus may define the unit of allocation/deallocation for the cache. Cache lines may vary in size (e.g., 32 bytes, 64 bytes, or larger or smaller). Different caches may have different cache line sizes. There may further be more additional levels of cache between ICache 122/DCache 160 and the main memory, such as a last level cache. In various embodiments, ICache 122 is used to cache fetched instructions and DCache 160 is used to cache data fetched or generated by processor 110.

Bias prediction circuitry 124, in various embodiments, is configured to produce a bias prediction as to whether a conditional instruction is biased taken, biased not taken, or non-biased (that is, whether the condition of the conditional instruction is biased true, biased false, or non-biased). As discussed, a conditional instruction being biased refers to the case where the condition of the conditional instruction is always true or false. For example, if the condition always evaluates to true, then the conditional instruction is considered biased true. And if the condition is always false, then the conditional instruction is considered biased false. Thus, when the conditional instruction is predicted to be biased true (or biased false), it means that the condition is predicted to be always true (or always false) and thus the conditional instruction is presumed to behave always one way (or another). When the conditional instruction is biased true or false, an evaluation of the condition that equals the opposite state (e.g., the condition evaluates to true when the conditional instruction is biased false) causes the conditional instruction to become non-biased. As discussed in more detail with respect to FIG. 3, a conditional instruction may transition through states of an acyclic state machine, starting at an initial state, progressing to either a bias taken state or a bias not-taken state, and ending at a non-bias state.

In various embodiments, state information about conditional instructions is stored in at least two bias tables 126 and bias prediction circuitry 124 may utilize bias tables 126 to provide a bias prediction for a conditional instruction. As discussed in more detail with respect to FIG. 4, a bias table 126 can comprise one or more entries, where each entry may be identified by an index value and include a bias indication that corresponds to a state in the acyclic state machine. When providing a bias prediction for a conditional instruction, bias prediction circuitry 124 may read the state information from the appropriate, respective entry within bias tables 126 that maps to that conditional instruction. As discussed in more detail with respect to FIG. 5, bias prediction circuitry 124 may index into bias tables 126 (to read the state information) using different hash functions that generate index values based on an address of the conditional instruction.

When bias tables 126 provide the same state information for a conditional instruction (e.g., bias tables 126 provide bias indications corresponding to the bias taken state), in various embodiments, bias prediction circuitry 124 provides a prediction based on the identified state (e.g., based on the bias taken state). When bias tables 126 provide conflicting state information for a conditional instruction (e.g., one bias table 126 provides a bias indication corresponding to the bias taken state while another bias table 126 provides a bias indication corresponding to the initial state), in various embodiments, bias prediction circuitry 124 provides the prediction based on a resolution of the conflict that is determined based on a relative ordering of the states in the acyclic state machine. Generally speaking, bias prediction circuitry 124 provides the prediction based on which state is most upstream in the acyclic state machine relative to the other identified state(s). How different conflicts based on different combinations of states read from bias tables 126 are resolved is discussed in more detail with respect to FIG. 6. Based on a bias prediction provided by bias prediction circuitry 124, in various embodiments, fetch and decode circuitry 120 fetches a speculative path of instructions.

Instruction prediction circuitry 128, in various embodiments, is configured to produce an instruction prediction as to whether the condition of a conditional instruction is true or false. However, unlike the bias prediction of bias prediction circuitry 124, the instruction prediction may not necessarily indicate whether the conditional instruction is biased taken or biased not taken, or in other words, always true or always false. Thus, the bias prediction of bias prediction circuitry 124 and the instruction prediction of instruction prediction circuitry 128 may indicate different properties of a conditional instruction. As discussed in more detail with respect to FIG. 2, bias prediction circuitry 124 and instruction prediction circuitry 128 may provide their predictions at different stages of the processing of a conditional instruction in fetch and decode circuitry 120. In various embodiments, a bias prediction from bias prediction circuitry 124 for a conditional instruction overrides the instruction prediction provided by instruction prediction circuitry 128 for that conditional instruction.

In various embodiments, instruction prediction circuitry 128 also utilizes one or more tables to generate the instruction prediction for a conditional instruction. However, unlike bias prediction circuitry 124, at least some of the tables may be heavily associated with the previous prediction history (e.g., by instruction prediction circuitry 128) and/or the evaluation history of conditional instructions. Further, sometimes the history may involve history of the specific conditional instruction, but also history of other conditional instructions in the same code. For example, in various embodiments, instruction prediction circuitry 128 is a TAgged GEometric length predictor (also called the TAGE predictor) that includes a basic predictor To and a set of (partially) tagged predictors $T_i$ ($1 \le i \le M$). The basic predictor To may use a basic table to provide a basic prediction, and the indices of the basic table may be generated by hashing the addresses of conditional instructions. By comparison, the tagged predictors $T_i$ ($1 \le i \le M$) may each have a table (i) ($1 \le i \le M$), whose indices may be created by hashing (a) the addresses of conditional instructions and (b) the previous prediction and/or evaluation history of those instructions. The addresses may be concatenated with the history and then hashed to generate the indices.

In various embodiments, the tables (i) of different tagged predictors $T_i$ ($1 \le i \le M$) may be associated with different history lengths. For example, the higher the order of a tagged predictor (e.g., the larger the i), the longer the history may be used to generate the indices for the table (i) of the tagged predictor $T_i$ ($1 \le i \le M$). Accordingly, the tagged predictor $T_i$ ($1 \le i \le M$) may use their respective tables (i) ($1 \le i \le M$) to provide a respective prediction for a conditional instruction. In various embodiments, the hashing functions for bias tables 126 of bias prediction circuitry 124 and the basic table of the instruction prediction circuitry 128 may be different. Further, in some embodiments, the hashing functions for the different tables (i) of the different predictors $T_i$ ($0 \le i \le M$) may be also different. In addition, the hashing functions described above may be implemented based on any appropriate hashing functions, including exclusive or (or XOR) operations.

For a conditional instruction, to provide an instruction prediction, instruction prediction circuitry 128 may determine the indices for the respective (M+1) predictors ($0 \le i \le M$) based on the address of the conditional instruction and history (for tagged predictors only), identify a matching predictor with the longest history (e.g., with the highest order), and then use the prediction from the matched predictor as the (final) instruction prediction for the conditional instruction. Accordingly, it can be seen that instruction prediction circuitry 128 may be more complicated than bias prediction circuitry 124 and therefore consume more time to make a prediction. Thus, use of bias prediction circuitry 124 to allow predictively-biased conditional instructions to "bypass" instruction prediction circuitry 128 may reduce the overall workload and improve efficiency of processor 110.

MDR circuitry 130, in various embodiments, is circuitry that is configured to map ops received from fetch and decode circuitry 120 to speculative resources to permit out-of-order and/or speculative execution. In particular, those ops may be mapped to physical registers in register file 155 from the architectural registers that are used in the corresponding instructions. Accordingly, MDR circuitry 130 may store a set of mappings between architectural registers and physical registers. Register file 245 may implement a set of physical registers that is greater in number than the architectural registers that are used in the instruction set architecture that is implemented by processor 110. In various embodiments, there are separate physical registers for different operand types (e.g., integer, floating point, etc.). The physical registers, however, may be shared between different operand types. MDR circuitry 130, in various embodiments, includes circuitry that is configured to dispatch ops to reservation stations. As depicted, MDR circuitry 130 can dispatch ops to RS 143 and RS 142 in LSU 140. MDR circuitry 130 can also include circuitry that is configured to track the speculative execution and retires ops (or flushes misspeculated ops). In various embodiments, reorder buffer 132 is used in tracking the program order of ops and managing retirement/flush.

LSU 140, in various embodiments, is configured to execute memory ops received from MDR circuitry 130. Generally, a memory op is an instruction op that specifies an access to memory, although that memory access may be completed in a cache such as DCache 160. A load memory op may specify a transfer of data from a memory location to a register located in processor 110, while a store memory op may specify a transfer of data from a register to a memory location. Load memory ops can be referred to as load ops or loads, and store memory ops can be referred to as store ops or stores. In various cases, the instruction set architecture implemented by processor 110 permits memory accesses to different addresses to occur out of order but may require memory accesses to the same address (or overlapping addresses, where at least one byte is accessed by both overlapping memory accesses) to occur in program order.

LSU 140 may implement multiple load pipelines ("pipes"). Each pipeline may execute a different load, independent and in parallel with other loads in other pipelines. Consequently, RS 142 may issue any number of loads up to the number of load pipes in the same clock cycle. Similarly, LSU 140 may further implement one or more store pipes. In various embodiments, the number of store pipes is not equal to the number of load pipes—e.g., two store pipes and three load pipes may be used. RS 142 may also issue any number of stores up to the number of store pipes in the same clock cycle.

Load/store ops, in various embodiments, are received at RS 142, which is configured to monitor the source operands of the load/store ops to determine when they are available and then issue the ops to the load or store pipelines, respectively. AGU/TLB 144 may be coupled to one or more initial stages of the pipelines mentioned earlier. Some source operands may be available when the operations are received at RS 142, which may be indicated in the data that is received by RS 142 from MDR circuitry 130. Other operands may become available via execution of operations by execution circuitry 150 or even via execution of earlier load ops. The operands may be gathered by RS 142, or may be read from a register file 155 upon issue from RS 142 as shown in FIG. 1. In some embodiments, RS 142 is configured to issue load/store ops out of order (from their original order in the code sequence being executed by processor 110) as the operands become available.

AGU/TLB 144, in various embodiments, is configured to generate the address accessed by a load/store op when the load/store op is sent from RS 142. AGU/TLB 144 may further be configured to translate that address from an effective or virtual address created from the address operands of the load/store op to a physical address that can actually be used to address memory. In some embodiments, AGU/TLB 144 is configured to generate an access to DCache 160.

STQ 146, in various embodiments, track stores from initial execution to retirement by LSU 140 and may be responsible for ensuring that the memory ordering rules are not violated. Load ops may update an LDQ 148 entry preassigned to the load ops, and store ops may update STQ 146 to enforce ordering among operations. The store pipes may be coupled to STQ 146, which is configured to hold store ops that have been executed but have not committed. In some embodiments, STQ 146 is configured to detect that a load op hits on a store op during execution of the load op, and is further configured to cause a replay of the load op based on the detection of a hit on the store op and a lack of store data associated with the store op in STQ 146.

LDQ 148, in various embodiments, track loads from initial execution to retirement by LSU 140. LDQ 148 may be responsible for ensuring the memory ordering rules are not violated (between out of order executed loads, as well as between loads and stores). In the event that a memory ordering violation is detected, LDQ 148 may signal a redirect for the corresponding load. The redirect may cause processor 110 to flush that load and subsequent ops in program order, and refetch the corresponding instructions. Speculative state for the load and subsequent ops is discarded and ops are refetched by fetch and decode circuitry 120 and reprocessed to be executed again.

Execution circuitry 150, in various embodiments, include any types of execution units. For example, execution circuitry 150 may include integer execution units configured to execute integer ops, floating point execution units configured to execute floating point ops, or vector execution units configured to execute vector ops. Execution circuitry 150 can include a branch execution unit. Generally, integer ops are ops that perform a defined operation (e.g. arithmetic, logical, shift/rotate, etc.) on integer operands and floating point ops are ops that have been defined to operate on floating point operands. Vector ops may be used to process media data (e.g. image data such as pixels, audio data, etc.). Each execution unit may comprise hardware configured to perform the operations defined for the ops that that execution unit is defined to handle. The execution units may generally be independent of each other in that each execution unit is configured to operate on an op that was issued to that execution unit without dependence on other the execution units. Different execution units may have different execution latencies (e.g., different pipe lengths). Any number and type of execution units may be included within execution circuitry 150, in various embodiments, including embodiments having one execution unit and embodiments having multiple execution units.

CIF 170, in various embodiments, is responsible for communicating with the rest of the system that includes processor 110, on behalf of processor 110. For example, CIF 170 may be configured to request data for ICache 122 misses and DCache 160 misses. When the data is returned, CIF 170 may then signal the cache fill to the corresponding cache. For DCache fills, CIF 170 may inform LSU 140 (and more particularly LDQ 148). In some cases, LDQ 148 may schedule replayed loads that are waiting on the cache fill so that the replayed loads forward the fill data as it is provided to DCache 160 (referred to as a fill forward operation). If the replayed load is not successfully replayed during the fill, then that replayed load may be subsequently scheduled and replayed through DCache 160 as a cache hit. CIF 170 may writeback modified cache lines that have been evicted by DCache 160, merge store data for non-cacheable stores, etc. Also, CIF 170 may interact with a last level cache of the processor complex that includes processor 110.

Figure 2:
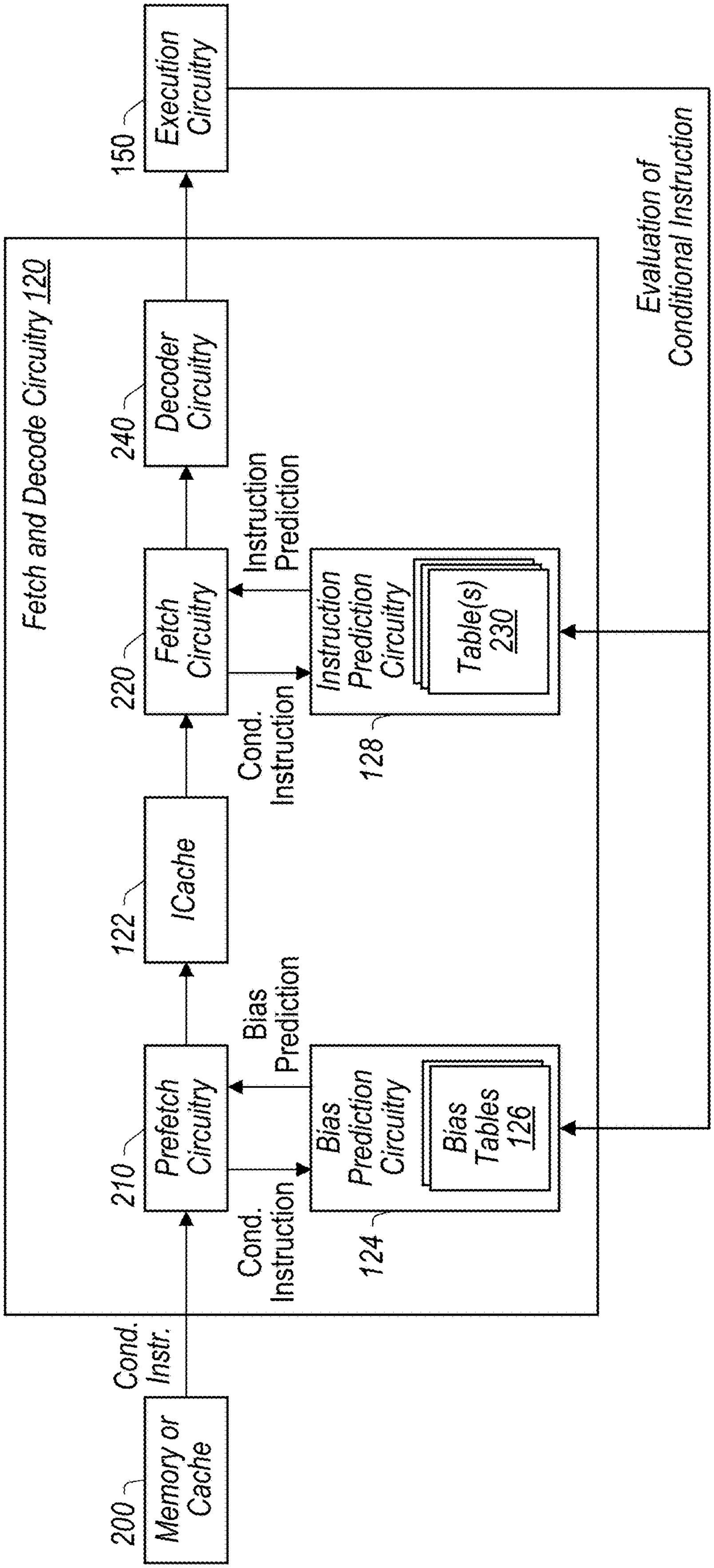
FIG. 2 is a block diagram illustrating one embodiment of fetch and decode circuitry that includes bias prediction circuitry and instruction prediction circuitry.

Turning now to FIG. 2, a block diagram of an embodiment of fetch and decode circuitry 120 comprising bias prediction circuitry 124 and instruction prediction circuitry 128 is shown. In the illustrated embodiment, there is fetch and decode circuitry 120, a memory or cache 200, and execution circuitry 150. As further shown, fetch and decode circuitry 120 includes ICache 122, bias prediction circuitry 124, instruction prediction circuitry 128, fetch circuitry 220, and decoder circuitry 240. Also as shown, bias prediction circuitry 124 includes bias tables 126, and instruction prediction circuitry 128 includes tables 230. The illustrated embodiment may be implemented differently than shown. For example, instruction prediction circuitry 128 may include a single table 230.

As shown in the illustrated embodiment, fetch and decode circuitry 120 may implement a pipeline having several stages. To process an instruction, in various embodiments, fetch and decode circuitry 120 may first use prefetch circuitry 210 to load the instruction from memory or cache 200 to ICache 122 (hereinafter referred to as the "prefetch" stage). Memory 200 may be implemented using different physical memory media, such as hard disk storage, floppy disk storage, removable disk storage, flash memory, random access memory (RAM-SRAM, EDO RAM, SDRAM, DDR SDRAM, etc.), read only memory (PROM, EEPROM, etc.), etc. Cache 200 may be a last level cache, a cache in a memory controller of system 100, etc. In various cases, an instruction may already exist in ICache 122 as it was previously loaded from memory or cache 200. In that case, the prefetch stage may be avoided and the instruction may be fetched directly from ICache 122 for execution.

Next, the instruction may be fetched by fetch circuitry 220 from ICache 122 and issued to decoder circuitry 240 for decoding (hereinafter referred to as the "fetch" stage). In various embodiments, decoder circuitry 240 decodes the instruction, converts it to operation(s) and/or micro-operation(s) (hereinafter referred to as the "decoding" stage), and sends the operation(s) and/or micro-operation(s) to execution circuitry 150 for execution. For purposes of illustration, FIG. 2 may not depict all the components between memory 200, fetch and decode circuitry 120, and execution circuitry 150. For example, as shown in FIG. 1, there can be MDR circuitry 130 between fetch and decode circuitry 120 and execution circuitry 150.

As shown, fetch and decode circuitry 120 processes conditional instructions. Execution of code that involves a conditional instruction may depend on the condition of the conditional instruction. When the condition of a conditional branch instruction is true, a first instruction from a first target address may be loaded, fetched, and executed. Conversely, when the condition of the conditional branch instruction is false, a second instruction from a second target address may be loaded, fetched, and executed. For purposes of illustration, below is an example code including a conditional instruction:

```
If (a > b)    // the conditional instruction
{
x = 1;        // the instruction to be executed when the condition is true
}
else
{
x = 2;        // the instruction to be executed when the condition is false
}
```

In this example, the conditional instruction simply involves a comparison between the values of two variable "a" and "b." If the condition of the conditional branch instruction is true (i.e., the value of "a" is greater than the value of "b"), a first instruction from a first target address is executed to assign the value of the variable "x" to 1. Conversely, if the condition is false (i.e., the value of "a" is not greater than the value of "b"), a second instruction from a second target address is executed to assign the value of the variable "x" to 2.

In various embodiments, fetch and decode circuitry 120 may speculatively process a conditional instruction. For example, fetch and decode circuitry 120 may predict the outcome of a conditional instruction prior to the (actual) execution of the conditional instruction, and based on the prediction speculatively determine a target address based on which a subsequent instruction may be obtained for execution. To improve efficiency, fetch and decode circuitry 120 may use bias prediction circuitry 124 with bias tables 126 to provide a bias prediction as to whether the conditional instruction is biased taken or not taken. When a conditional instruction is predicted to be biased taken or not taken, fetch and decode circuitry 120 may use the bias prediction from bias prediction circuitry 124 to process the conditional instruction. In various embodiments, fetch and decode circuitry 120 may recode the conditional instruction in ICache 122 based on the bias prediction indicating that the conditional instruction is biased to a particular outcome (e.g., taken or not taken). When the conditional instruction is predicted not to be biased taken or not taken, fetch and decode circuitry 120 may use instruction prediction circuitry 128 with tables 230 to provide another prediction, such as an instruction prediction, as to whether the condition of the conditional instruction is true or false and then use that instruction prediction to speculatively process the conditional instruction.

Bias prediction circuitry 124 and instruction prediction circuitry 128 may perform their respective predictions at different stages of the processing of a conditional instruction in fetch and decode circuitry 120. For example, in the illustrated embodiment, bias prediction circuitry 124 provides the bias prediction for a conditional instruction at the prefetch stage when that conditional instruction is loaded from memory or cache 200 into ICache 122. By comparison, instruction prediction circuitry 128 provides the instruction prediction at a relatively "later" stage, such as the fetch stage when the conditional instruction is fetched from ICache 122 to decoder circuitry 240. But in some embodiments, bias prediction circuitry 124 and instruction prediction circuitry 128 provide their respective predictions around the same time, e.g., both at the same stage such as the prefetch stage, the fetch stage, etc.

In various cases, when a conditional instruction is predicted to be biased taken or not taken, fetch and decode circuitry 120 may cause the conditional instruction to "bypass" the instruction prediction circuitry 128. That is, the instruction prediction circuitry 128 may not necessarily provide the second prediction such as the instruction prediction. Alternatively, sometimes fetch and decode circuitry 120 may still use the instruction prediction circuitry 128 to provide the instruction prediction. However, when the conditional instruction is predicted to be biased taken or not taken, fetch and decode circuitry 120 may ignore the instruction prediction from the instruction prediction circuitry 128, and instead use the bias prediction from the bias prediction circuitry 124 to speculatively process the conditional instruction as described above.

The bias prediction and the instruction prediction are both merely predictions and thus either one of them may be erroneous. In various embodiments, the quality of the predictions is determined after the conditional instruction is executed by execution circuitry 150. Consider the foregoing example code, once values of the operands (i.e., the variables "a" and "b") are obtained, and the operator (i.e., ">") is applied to the operands, execution circuitry 150 may be able to determine whether the condition of the conditional instruction is actually true or false, and accordingly evaluate whether the bias prediction and/or the instruction prediction is correct. As shown, bias prediction circuitry 124 and/or the instruction prediction circuitry 128 may be updated based on the evaluation of the conditional instruction. For example, when the bias prediction and/or the instruction prediction is a misprediction, bias tables 126 and/or tables 230 may be updated.

When a misprediction occurs, processor 110 may have to discard the speculative work, and retrieve an instruction from the correct target address in the case of a conditional branch instruction. For example, execution circuitry 150 may discard the instruction in the execution pipe that was speculatively fetched, and fetch and decode circuitry 120 may have to redirect prefetch circuitry 210 and/or fetch circuitry 220 to obtain the instruction from the correct target address for execution. This can cause additional delays to operations of processor 110. However, in practice, many of the conditional instructions may be biased instructions. Thus, even with the above penalty caused by mispredictions, use of bias prediction circuitry 124 may still increase the overall efficiency of processor 110. Especially, if processor 110 allows for predictively-biased conditional instructions to "bypass" instruction prediction circuitry 128, this may greatly reduce the overall workload and improve efficiency of processor 110.

Figure 3:
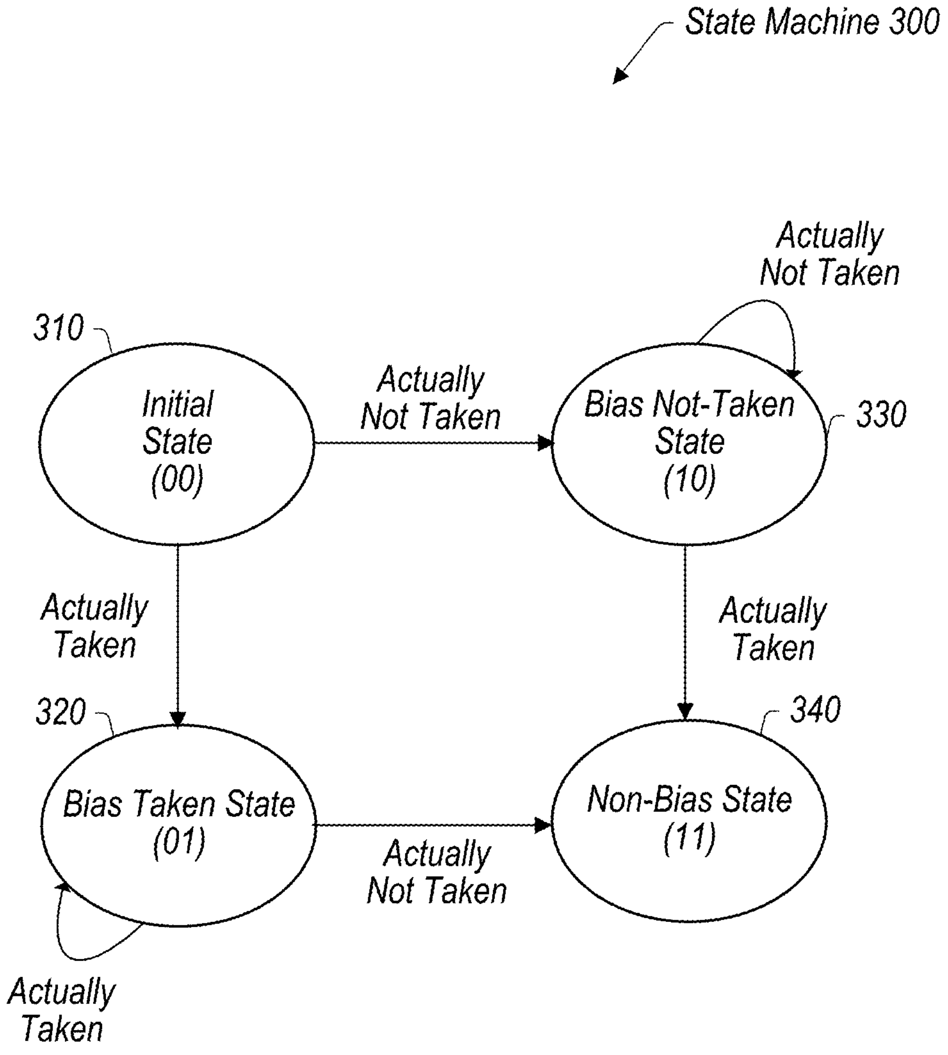
FIG. 3 is a block diagram illustrating one embodiment of a state machine that includes an initial state, a bias taken state, a bias not-taken state, and a non-bias state.

Turning now to FIG. 3, a block diagram of one embodiment of a state machine 300 that comprises an initial state 310, a bias taken state 320, a bias not-taken state 330, and a non-bias state 340 is shown. As shown, state machine 300 can flow from initial state 310 to either bias taken state 320 or bias not-taken state 330, and from bias taken state 320 or bias not-taken state 330 to non-bias state 340. Accordingly, bias taken state 320 and bias not-taken state 330 are downstream from initial state 310, and non-bias state 340 is downstream from bias taken state 320 and bias not-taken state 330.

In various embodiments, state machine 300 is acyclic with respect to the flow between states that results from the evaluations of conditional instructions. That is, in various embodiments, an evaluation of a conditional instruction (i.e., whether it was actually taken or not taken) cannot cause a state transition from a downstream state to an upstream state (e.g., a non-biased conditional instruction cannot become a biased taken conditional instruction because of an evaluation returned by execution circuitry 150). In this regard, state machine 300 is acyclic and thus can be referred to as acyclic state machine 300. But in various cases, a reset signal that is functionally orthogonal to the inputs that cause all other state transitions may be asserted to reset states associated with the conditional instructions to the initial state—bias prediction circuitry 124 may perform a reset operation to reset all bias indications/values stored in bias tables 126 to correspond to initial state 310 ("00") in state machine 300. So while the state (e.g., bias taken state 320) associated with a conditional instruction may be reset to initial state 310, in various embodiments, state machine 300 is still considered acyclic with respect to its conditional instruction behavior inputs (i.e., actually taken or not taken).

Figure 4:
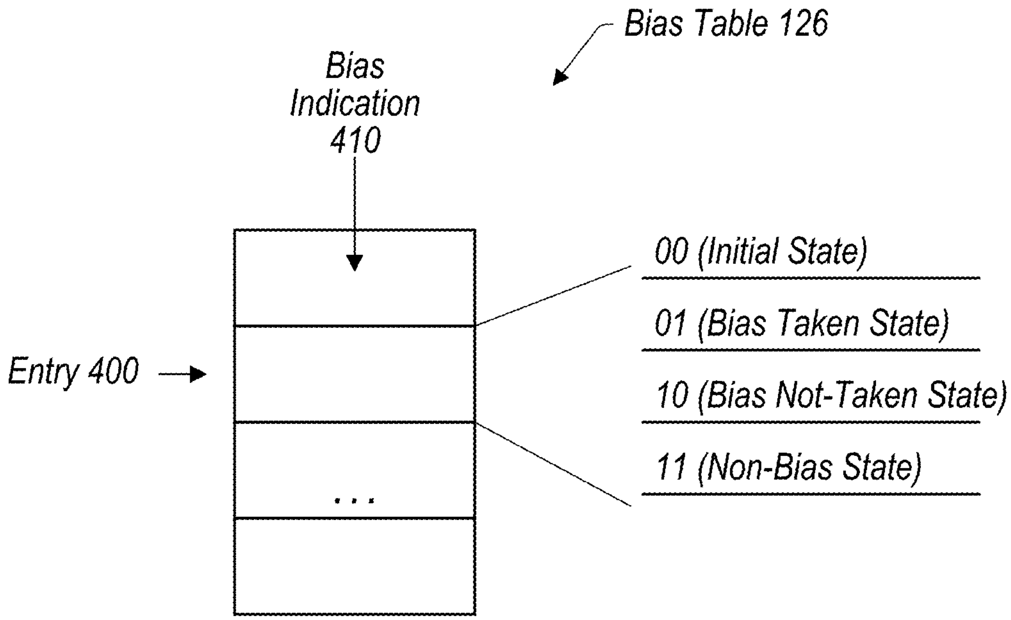
FIG. 4 is a block diagram illustrating one embodiment of a bias table configured to store bias indications corresponding to states of the state machine.

As discussed in more detail with respect to FIG. 4, bias tables 126 may store 2-bit values indicating different predictions as to the biasness of a conditional instruction. Accordingly, as depicted in FIG. 3, value "00" is designated as initial state 310 for conditional instructions. At start-up (for example), the value for a conditional instruction in a bias table 126 may be set as the default value "00" as its bias has not been determined and thus it is associated with initial state 310. That is, when the conditional instruction is loaded from memory or cache 200 into ICache 122 for the first time, assuming that there is no hash collision yet with respect to the conditional instruction, it may be the first time for bias prediction circuitry 124 to encounter a conditional instruction that corresponds to the entry of that conditional instruction in a bias table 126 and thus has not had a chance to determine the biasness of the conditional instruction. Thus, the value for the conditional instruction in a given bias table 126 may be "00". Because the value "00" does not indicate that the conditional instruction is biased taken or not taken, fetch and decode circuitry 120 may use instruction prediction circuitry 128 to provide a second prediction, such as an instruction prediction, for the conditional instruction.

After execution of the instruction, e.g., in execution circuitry 150, the condition of the conditional instruction can actually be determined, and therefore the bias prediction from bias prediction circuitry 124 may be evaluated according to the outcome of the execution of that instruction. If the evaluation determines that the conditional instruction is actually taken, the conditional instruction transitions from initial state 310 to bias taken state 320, which is represented by the value "01", as the conditional instruction is biased taken. Likewise, if the evaluation determines that the conditional instruction is actually not taken, the conditional instruction transitions from initial state 310 to bias not-taken state 330, which is represented by the value "10", as the conditional instruction is biased not taken.

Once being transitioned to bias taken state 320 or bias not-taken state 330, a conditional instruction may remain in that state until a misprediction occurs. In other words, once the value for a conditional instruction in a bias table 126 is updated from initial state 310, bias prediction circuitry 124 may refrain from changing it to another value until a misprediction occurs. From an operational perspective, it means that, in various embodiments, bias prediction circuitry 124 unconditionally predicts the condition of the conditional instruction in the same manner, until an evaluation of the conditional instruction indicates that the bias prediction is a misprediction. When such a misprediction occurs, the conditional instruction transitions from bias taken state 320 or bias not-taken state 330 to non-bias state 340, which is represented by the value "11", as the conditional instruction is now deemed not biased in the current tracking interval (that is, since the last reset).

While the different states are represented by 2-bit values in the illustrated embodiment, in other embodiments, the different states may be represented by more bits. Furthermore, while particular bit combinations are used to represent the different states (e.g., "00" for initial state 310) in the illustrated embodiment, in other embodiments, other bit combinations may be used (e.g., "11" for initial state 310). Furthermore, while state values stored for different conditional instructions may be reset to the initial state value due to a reset signal (which may be asserted periodically, after a threshold number of conditional instructions have become non-biased, or after another saturation threshold is satisfied), in some embodiments, conditional instructions may only be reset to initial state 310 upon restarting system 100.

Turning now to FIG. 4, a block diagram of one embodiment of a bias table 126 having entries 400 that each store a bias indication 410 corresponding to a state of state machine 300 is shown. In the illustrated embodiment, bias indications 410 are stored in bias table 126 as 2-bit values that indicate different predictions as to the biasness of a conditional instruction—in other embodiments, more bits and/or different bit combinations are used. When bias table 126 is initialized, in various embodiments, all entries 400 of bias table 126 store a bias indication 410 "00" representing initial state 310, indicating that no conditional instruction corresponding to those entries has been encountered before by bias prediction circuitry 124. As conditional instructions are evaluated and their outcomes are provided to bias prediction circuitry 124, the corresponding entries 400 in bias table 126 may be updated. As discussed, the value "01" may indicate that a conditional instruction is biased taken while the value value "10" may indicate that the conditional instruction is biased not taken. Further, the value "11" may indicate that the conditional instruction is not biased, albeit the conditional instruction corresponding to the entry of this value has been encountered before by bias prediction circuitry 124.

Figure 5:
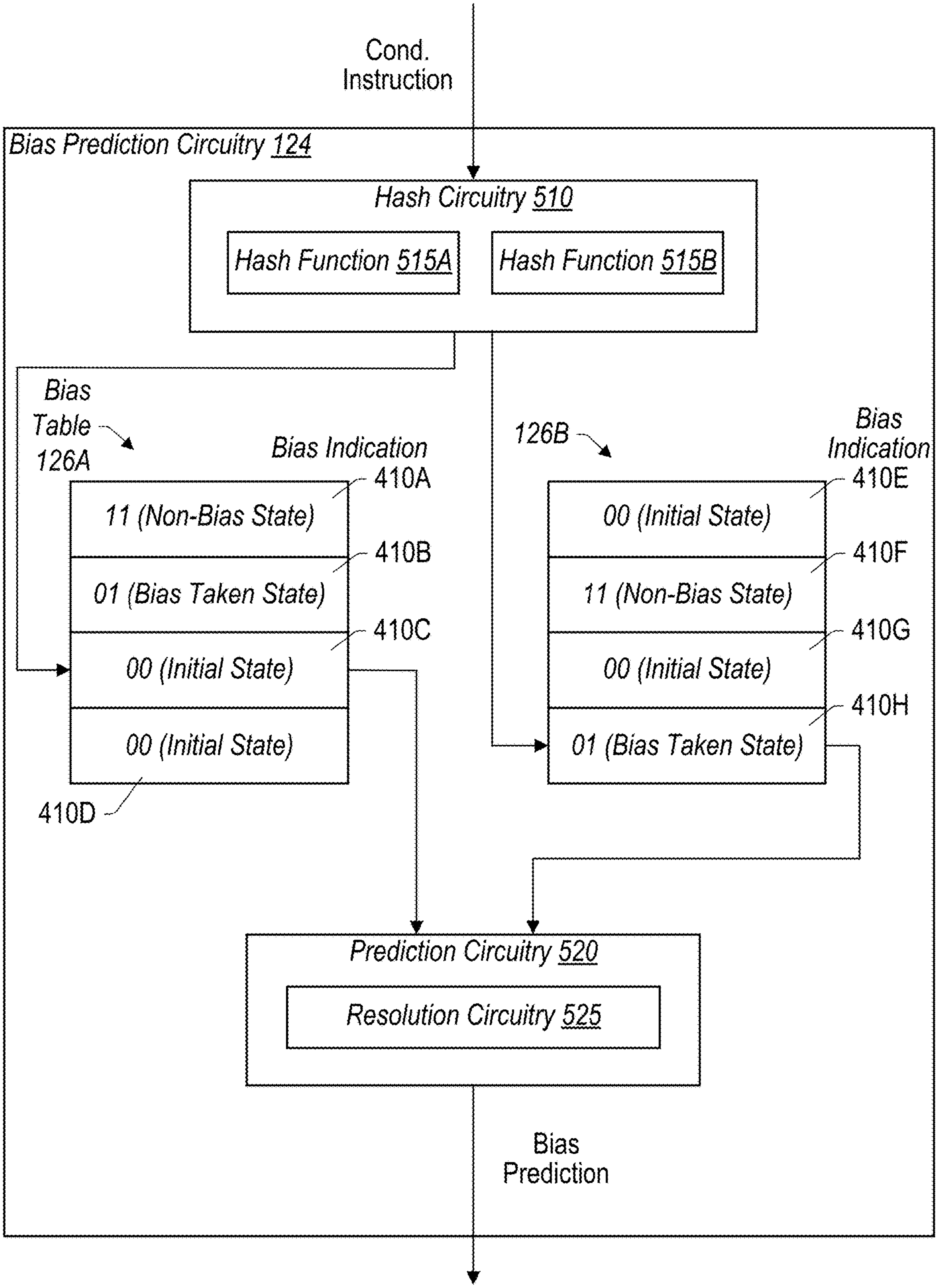
FIG. 5 is a block diagram illustrating one embodiment of bias prediction circuitry that includes prediction circuitry configured to produce a bias prediction based on bias indications obtained from bias tables.

Turning now to FIG. 5, a block diagram of one embodiment of bias prediction circuitry 124 that includes prediction circuitry 520 configured to produce a bias prediction based on bias indications 410 from bias tables 126 is shown. In the illustrated embodiment, bias prediction circuitry 124 includes bias tables 126A and 126B, hash circuitry 510, and prediction circuitry 520. As shown, bias table 126A stores bias indications 410A-D and bias table 126B stores bias indications 410E-H. Also as shown, hash circuitry 510 implements hash functions 515A and 515B, and prediction circuitry 520 includes resolution circuitry 525. Bias prediction circuitry 124 may be implemented differently than shown. As an example, bias prediction circuitry 124 may include more than only two bias tables 126.

Hash circuitry 510, in various embodiments, is configured to implement a hash function to generate an index value based on a conditional instruction (particularly, a virtual address of the conditional instruction). In the context of hashing, the addresses of conditional instructions may be considered the "keys" and bias indications 410 stored in entries 400 may be considered the "values," the two of which may be associated with each other via index values that result from a hash function 515 applied to the keys. Accordingly, for a conditional instruction, bias prediction circuitry 124 may identify a bias indication 410 in a corresponding entry 400 of a bias table 126 (the "value") based on the address of the conditional instruction (e.g., the "key"), and then provide a bias prediction for the conditional instruction based on that bias indication 410. In some cases, when bias prediction circuitry 124 receives a conditional instruction, bias prediction circuitry 124 may obtain the address of the conditional instruction from the program counter (PC), and hash circuitry 510 may determine an index based on the address using a hash function 515. Bias prediction circuitry 124 may use that index to find an entry 400 matching the index, obtain the bias indication 410 stored in the entry 400, and then use the bias indication 410 to determine the bias prediction for the conditional instruction.

The indexes of a bias table 126 may be subject to hashing collision, i.e., a phenomenon where different addresses of different conditional instructions hash into an identical index. In other words, different keys correspond to the same entry and hence the same value in a bias table 126. To reduce the effects of hashing collisions (also referred to as "aliasing"), in various embodiments, bias prediction circuitry 124 includes multiple bias tables 126 that are indexed using different hash functions 515, as depicted for example. In the illustrated embodiment, hash circuitry 510 implements hash function 515A to derive indexes for bias table 126A and hash function 515B to derive indexes for bias table 126B. Accordingly, when a conditional instruction is received and its address obtained, hash circuitry 510 may perform hash function 515A with the address to generate an index into bias table 126A to access an entry 400 of bias table 126A that corresponds to the conditional instruction and perform hash function 515B with the address to generate an index into bias table 126B to access an entry 400 that corresponds to the conditional instruction.

In various embodiments, hash functions 515A and 515B are different hash functions to attempt to prevent a given conditional instruction from indexing into the same entry position within both bias tables 126. As a result, a first conditional instruction that aliases/collides with a second conditional instruction in one bias table 126 (e.g., bias table 126B) is very unlikely to alias/collide with the second conditional instruction in the other bias table 126 (e.g., bias table 126A). As shown for example, bias prediction circuitry 124 receives a conditional instruction that indexes into the third entry of bias table 126A and the fourth entry of bias table 126B that store bias indications 410C and 410H, respectively. In illustrated embodiment, bias indications 410C and 410H correspond to different states in state machine 300 and therefore the received conditional instruction has collied with another conditional instruction. Because bias indication 410C corresponds to initial state 310 and bias indication 410H corresponds to bias taken state 320, the collision has occurred with regard to the fourth entry of bias table 126B. But since the hash functions 515 attempt to index a given conditional instruction to different entry positions in bias tables 126 with respect to each other, the other conditional instruction does not collide with the received conditional instruction in bias table 126A. In the illustrated embodiment, the other conditional instruction may map to the second entry of bias table 126A as it includes bias indication 410B, which corresponds to bias taken state 320. As a result of this property, when bias prediction circuitry 124 reads bias indications 410 that correspond to different states, bias prediction circuitry 124 may implement a policy to resolve the conflict such that a correct state is selected and used to generate a bias prediction.

Prediction circuitry 520, in various embodiments, generates a bias prediction based on bias indications 410 obtained from bias tables 126 and further includes resolution circuitry 525 to resolve conflicts resulting from conflicting bias indications 410. When bias indications 410 corresponding to the same state are obtained from bias tables 126, prediction circuitry 520 may generate a bias prediction based on that state without having to perform any conflict resolution process. For example, a conditional instruction may be received that indexes into the first entry in bias table 126A and the second entry in bias table 126B. As a result, prediction circuitry 520 obtains bias indications 410A and 410F that correspond to the same state, non-bias state 340. Accordingly, prediction circuitry 520 may generate and provide a bias prediction based on non-bias state 340. In some embodiments, prediction circuitry 520 does not generate and provide a bias prediction since the conditional instruction is not biased taken nor biased not taken.

But when bias indications 410 corresponding to different states are obtained from bias tables 126, resolution circuitry 525 may select a state based on a relative ordering of the states in state machine 300 and the bias indications 410 obtained from bias tables 126. For example, resolution circuitry 525 may receive bias indications 410A and 410H that correspond to non-bias state 340 and bias taken state 320, respectively. Resolution circuitry 525 may select bias indication 410H to use to generate the bias prediction for the received conditional instruction based on bias taken state 320 being more upstream in state machine 300 than non-bias state 340. In particular, in various embodiments, state machine 300 is acyclic with state transitions going from upstream states to downstream states (except when a reset happens), as discussed. Due to this property, when bias indications 410 correspond to different states and one of those states is more downstream than the other state, the bias indication 410 corresponding to the more downstream is a result of a hash collision while the other bias indication 410 may not be set as a result of a hash collision. Thus, resolution circuitry 525 may select the bias indication 410 that is more upstream. How different conflicts are resolved is discussed in more detail with respect to FIG. 6. In various embodiments, prediction circuitry 520 generates and provides a bias prediction based on the resolution determined by resolution circuitry 525.

Turning now to FIG. 6, a block diagram of an example table of selected state outcomes based on different combinations of states (the states corresponding to the bias indications 410) read from two bias tables 126. As discussed, bias prediction circuitry 124 may implement a policy to determine the state to use when generating a bias prediction. An example of this policy is shown in the illustrated table that comprises a column "Table A," a column "Table B," and a column "Selected Outcome." Note that the value pair of a row listed under Table A and Table B is commutative. That is, a row applies if the given pair of states is read from both tables, regardless of which state is stored in which table. For example, the last row of the illustrated table shows that the bias taken state (i.e., bias taken state 320) is read from Table A (e.g., bias table 126A) and the non-bias state (i.e., non-bias state 340) is read from Table B (e.g., bias table 126B). The selected outcome is same for those states even if the bias taken state is read from Table B instead of Table A and the non-bias state is read from Table A instead of Table B.

The first four rows of the illustrated table may reflect the cases of either no aliasing or constructive aliasing in which two or more conditional instructions index to the same entry but have the same behavior (e.g., they are biased taken). The two state values read from Tables A and B agree with one another (that is, the obtained bias indications 410 correspond to the same state in state machine 300), so prediction circuitry 124 may provide a prediction based on the read value in the four cases illustrated in the first four rows. In some embodiments, prediction circuitry 124 does not provide a prediction if the state value corresponds to initial state 310 or non-bias state 340.

The remaining rows of the illustrated table reflect possible cases of destructive aliasing. In regard to state machine 300, in various embodiments, a bias indication 410 that corresponds to a downstream state cannot transition to an upstream state without a reset, as discussed. Thus, if a first conditional instruction aliases with a second conditional instruction in a downstream state, the downstream state may be preserved in the aliased entry 400 of a bias table 126—that is, the bias indication 410 in the aliased entry 400 is not updated to correspond to the upstream state of the first conditional instruction. Said differently, when a conflict arises between a state to be written in an entry 400 and the state already in that entry 400, in various embodiments, the downstream state prevails (regardless of whether it is the existing state of the entry 400 or the state to be written).

Given this behavior, it can be deduced that destructive aliasing arises only in the case when a conditional instruction aliases with one or more conditional instructions that are in a state downstream from it. Such aliasing manifests as a mismatch in the states read from bias tables 126. Furthermore, destructive aliasing may only affect the conditional instruction in the upstream state, because as noted above, the conditional instruction in the downstream state will retain its state in the aliased entry 400. That is, in the general case when there is aliasing in only one bias table 126, bias prediction circuitry 124 may read consistent state from both bias tables 126 for the conditional instruction in the downstream state but mismatched state for the aliasing conditional instruction in the upstream.

Consider an example in which a first conditional instruction initially transitions to bias taken state 320 and a bias indication 410 in a first entry 400 in Table A is set to bias taken state 320 and a bias indication 410 in a second entry 400 in Table B is set to bias taken state 320. Then suppose the first conditional instruction transitions to non-bias state 340 (e.g., because the first conditional instruction has been executed and was not taken) and those entries 400 in Tables A and B are updated to reflect non-bias state 340. Now suppose that a second conditional instruction transitions to bias taken state 320 and aliases in Table A with the first conditional instruction. As discussed above, in various embodiments, an upstream state (bias taken state 320) cannot override a downstream state (non-bias state 340). As a result, the first entry 400 in Table A remains as non-bias state 340. When bias prediction circuitry 124 reads Tables A and B for the first conditional instruction, it obtains bias indications 410 that both correspond to non-bias state 340 despite the aliasing. But when bias prediction circuitry 124 reads Tables A and B for the second conditional instruction, it will obtain bias indications 410 that correspond to different states: non-bias state 340 and bias taken state 320, respectively. Because such aliasing only affects the state observed by the upstream conditional instruction of the two aliasing conditional instructions, in various embodiments, the state that is used by prediction circuitry 124 when mismatching states are read from Tables A and B is the upstream state of the two. Accordingly, as illustrated in the last five rows of the table, the upstream state is selected (e.g., in the last row, bias taken state 320 and non-bias state 340 are read and thus bias taken state 320 is selected as the state to use for the bias prediction).

In some instances, when reading from bias tables 126, bias prediction circuitry 124 may read bias taken state 320 and bias not-taken state 330 for a conditional instruction. This conflict may occur if both of that conditional instruction's entries 400 are aliased to other conditional instructions that have resolved oppositely. That is, a first conditional instruction may transition to bias taken state 320 and a second conditional instruction may transition to bias not-taken state 330. The first conditional instruction may alias with a third conditional instruction in table A and the second conditional instruction may alias with a third conditional instruction in table B. As a result, if the third conditional instruction is in an upstream state relative to the other conditional instructions, then bias prediction circuitry 124 reads bias taken state 320 and bias not-taken state 330 for the third conditional instruction. Accordingly, if bias prediction circuitry 124 reads both bias taken state 320 and bias not-taken state 330 for a conditional instruction, it may be inferred that the conditional instruction did not cause either state to be written and that those states were written by aliased conditional instructions. Thus, in various embodiments, when bias prediction circuitry 124 reads both bias taken state 320 and bias not-taken state 330 for a conditional instruction, bias prediction circuitry 124 selects initial state 310 as the correct state for that conditional instruction.

Figure 7:
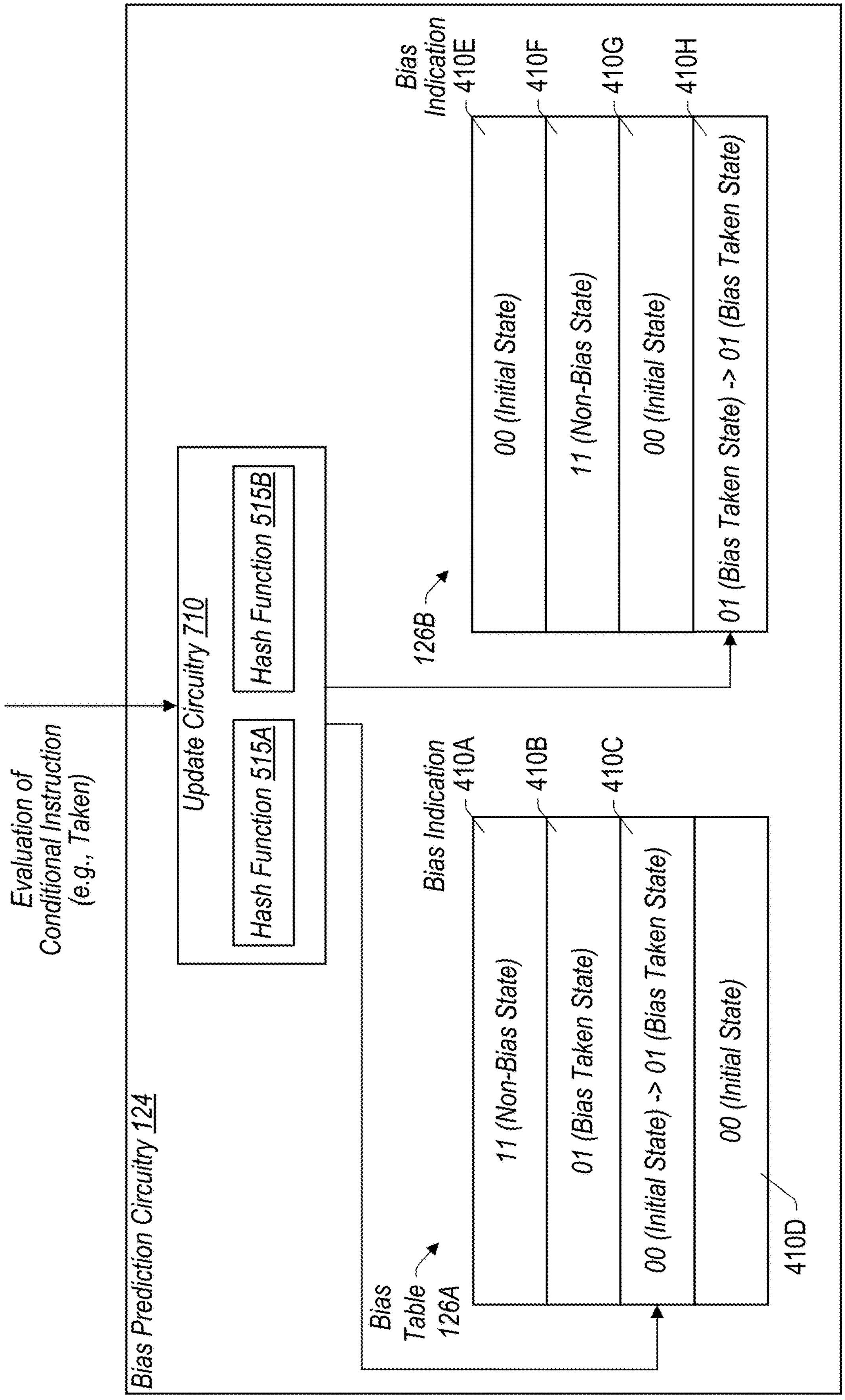
FIG. 7 is a block diagram illustrating one embodiment of bias prediction circuitry that includes update circuitry configured to update bias tables based on an evaluation/outcome of a conditional instruction.

Turning now to FIG. 7, a block diagram of one embodiment of bias prediction circuitry 124 having update circuitry 710 updates bias tables 126 based on an evaluation/outcome of a conditional instruction is shown. In the illustrated embodiment, bias prediction circuitry 124 includes bias tables 126A and 126B and update circuitry 710. As shown, bias table 126A stores bias indications 410A-D, bias table 126B stores bias indications 410E-H, and update circuitry 710 implements hash functions 515A and 515B—as such, update circuitry 710 may include or be combined with hash circuitry 510.

Update circuitry 710, in various embodiments, is configured to update bias tables 126 based on an evaluation of a conditional instruction (e.g., returned by execution circuitry 150). When updating an entry 400 in a bias table 126, in various embodiments, update circuitry 710 writes a bit value "1" to either the lower bit position or the upper bit position of the 2-bit bias indication 410 stored in the entry 400. In some embodiments, update circuitry 710 writes a bit value "1" to the lower bit position when a conditional instruction is taken and a bit value "1" to the upper bit position when a conditional instruction is not taken. In other embodiments, the lower bit position is set when a conditional instruction is not taken and the upper bit position is set when a conditional instruction is taken. Furthermore, in various embodiments, update circuitry 710 updates an entry 400 without reading the bias indication 410 of that entry since the taken and not taken cases can have respective predetermined bit positions (e.g., a bit value "1" may always be written to the lower bit position when a conditional instruction is taken). In some embodiments, update circuitry 710 reads the content of an entry 400 before updating it. For example, in another encoding scheme (e.g. initial state 310 is 01, bias taken state 320 is 10, etc.) than the one illustrated in FIG. 4, some bit may transition from 0 to 1 or from 1 to 0, and hence update circuitry 710 has to perform a read-modify-write operation in order to determine the original state before determining the new state. A read-modify-write operation refers to an operation in which update circuitry 710 (or another component) has to read a value before updating the value.

In the illustrated embodiment, the third entry of bias table 126A stores bias indication 410C that corresponds to initial state 310 and the fourth entry of bias table 126B stores bias indication 410H that corresponds to bias taken state 320. As illustrated, update circuitry 710 receives (e.g., from execution circuitry 150) an indication that a conditional instruction has evaluated to taken. That particular conditional instruction indexes to the third entry of bias table 126A and the fourth entry of bias table 126B. Accordingly, update circuitry 710 updates the entries by writing the bit value "1" to the lower bit position in the 2-bit bias indications 410 stored in those entries. Thus, bias indication 410C is updated from initial state 310 to bias taken state 320. But because the lower bit position of bias indication 410H is already set to the bit value "1", bias indication 410H does not change.

Accordingly, bias tables 126A and 126B can be updated independently (i.e., one table does not depend on the state of the other table), and the state transition of each bias table 126 may follow state machine 300. Thus, when the stored state for a conditional instruction in one bias table 126 is a misprediction, or an initial evaluation has occurred so that the instruction can transition from initial state 310, the stored state is transitioned to the next appropriate state independent of whether the stored state for the conditional instruction in the other bias table 126 is a misprediction. As such the evaluation of a conditional instruction can result in none, one, or both bias tables 126A and 126B being updated.

Figure 8:
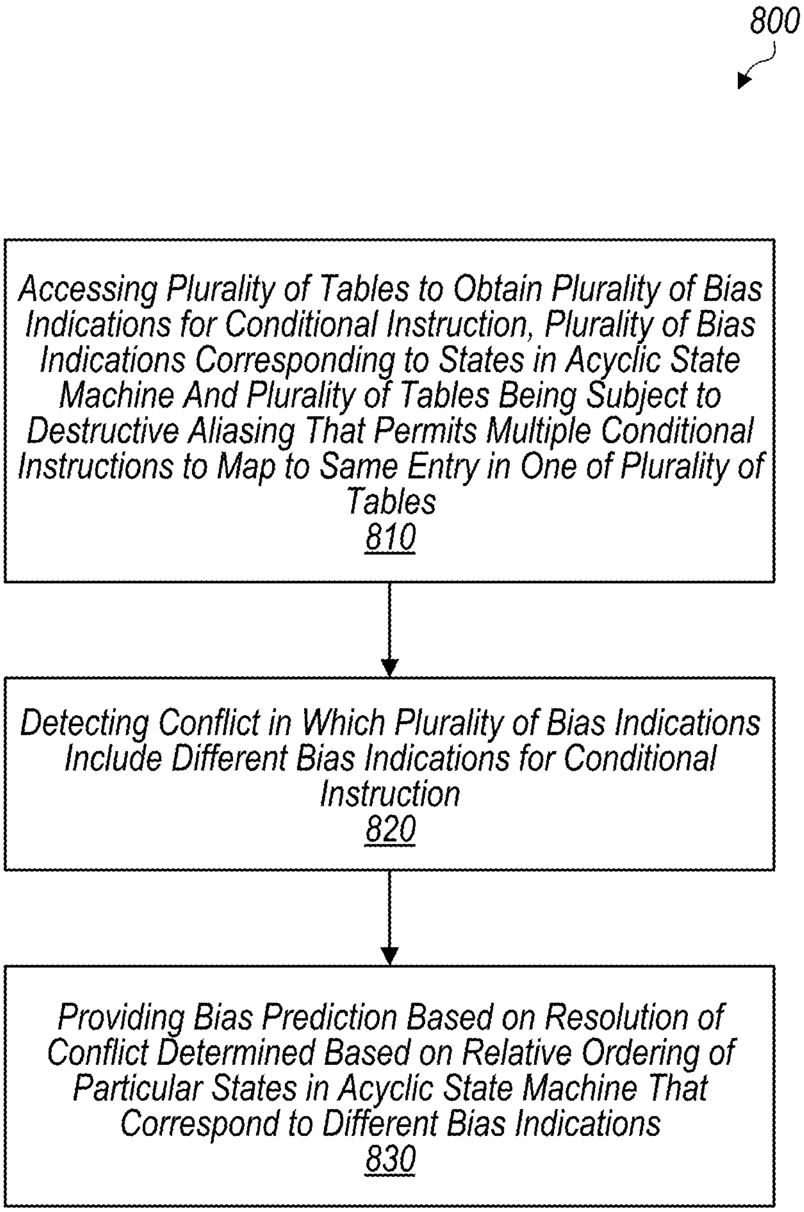
FIGS. 8-10 are flow diagrams illustrating example methods relating to providing a bias prediction, according to some embodiments.

Turning now to FIG. 8, a flow diagram of a method 800 is shown. Method 800 is one embodiment of a method performed by bias prediction circuitry (e.g., bias prediction circuitry 124) to produce a bias prediction for a conditional instruction. Method 800 may include more or fewer steps than shown—e.g., method 800 may include a step in which the bias prediction circuitry receives a conditional instruction (or a virtual address of the conditional instruction) from prefetch circuitry (e.g., prefetch circuitry 210).

Method 800 begins in step 810 with the bias prediction circuitry accessing a plurality of tables (e.g., bias tables 126) to obtain a plurality of bias indications (e.g., bias indications 410) for the conditional instruction, the plurality of bias indications corresponding to states in an acyclic state machine (e.g., state machine 300) and the plurality of tables being subject to destructive aliasing that permits multiple conditional instructions to map to a same entry in one or more of the plurality of tables. The acyclic state machine may include an initial state (e.g., initial state 310), a bias taken state (e.g., bias taken state 320), a bias not-taken state (bias not-taken state 330), and a non-bias state (e.g., non-bias state 340). The bias taken state and the bias not-taken state may be downstream from the initial state, and the non-bias state may be downstream from the bias taken state and the bias not-taken state. In various embodiments, the plurality of tables includes only two tables, and the prediction circuitry may be configured to index into the tables using different hash functions on an address of the conditional instruction. Further, the bias prediction circuitry may perform a reset operation to reset all bias indications in the plurality of tables to correspond to an initial state in the acyclic state machine.

In step 820, the bias prediction circuitry detects a conflict in which the plurality of bias indications include different bias indications for the conditional instruction. In step 830, the bias prediction circuitry provides the bias prediction based on a resolution of the conflict that is determined based on a relative ordering of particular states in the acyclic state machine that correspond to the different bias indications. To resolve the conflict, the bias prediction circuitry may determine which one of the particular states corresponding to the different bias indications is most upstream in the acyclic state machine. As an example, if the bias prediction circuitry obtains bias indications corresponding to the initial state and the bias taken state, then the bias prediction circuitry may provide the bias prediction based on the initial state (the determined state), which is more upstream than the bias taken state. Based on a detection that the particular states are not upstream and not downstream relative to each other in the acyclic state machine, the bias prediction circuitry may determine, to resolve the conflict, a state that is upstream to the particular states. As an example, if the bias prediction circuitry obtains bias indications corresponding to the bias not-taken state and the bias taken state, then the bias prediction circuitry may provide the bias prediction based on the initial state (the determined state), which is more upstream than the bias taken state and the bias not-taken state.

In various embodiments, a processor having the bias prediction circuitry also includes execution circuitry (e.g., execution circuitry 150) that is configured to execute the conditional instruction based on the bias prediction. The execution circuitry may provide, to the prediction circuitry, an evaluation indication that indicates whether the bias prediction is a misprediction. The prediction circuitry may be included in fetch and decode circuitry (of a processor) that is configured to recode the conditional instruction in an instruction cache (e.g., ICache 122) based on the bias prediction indicating that the conditional instruction is biased to the particular outcome.

Figure 9:
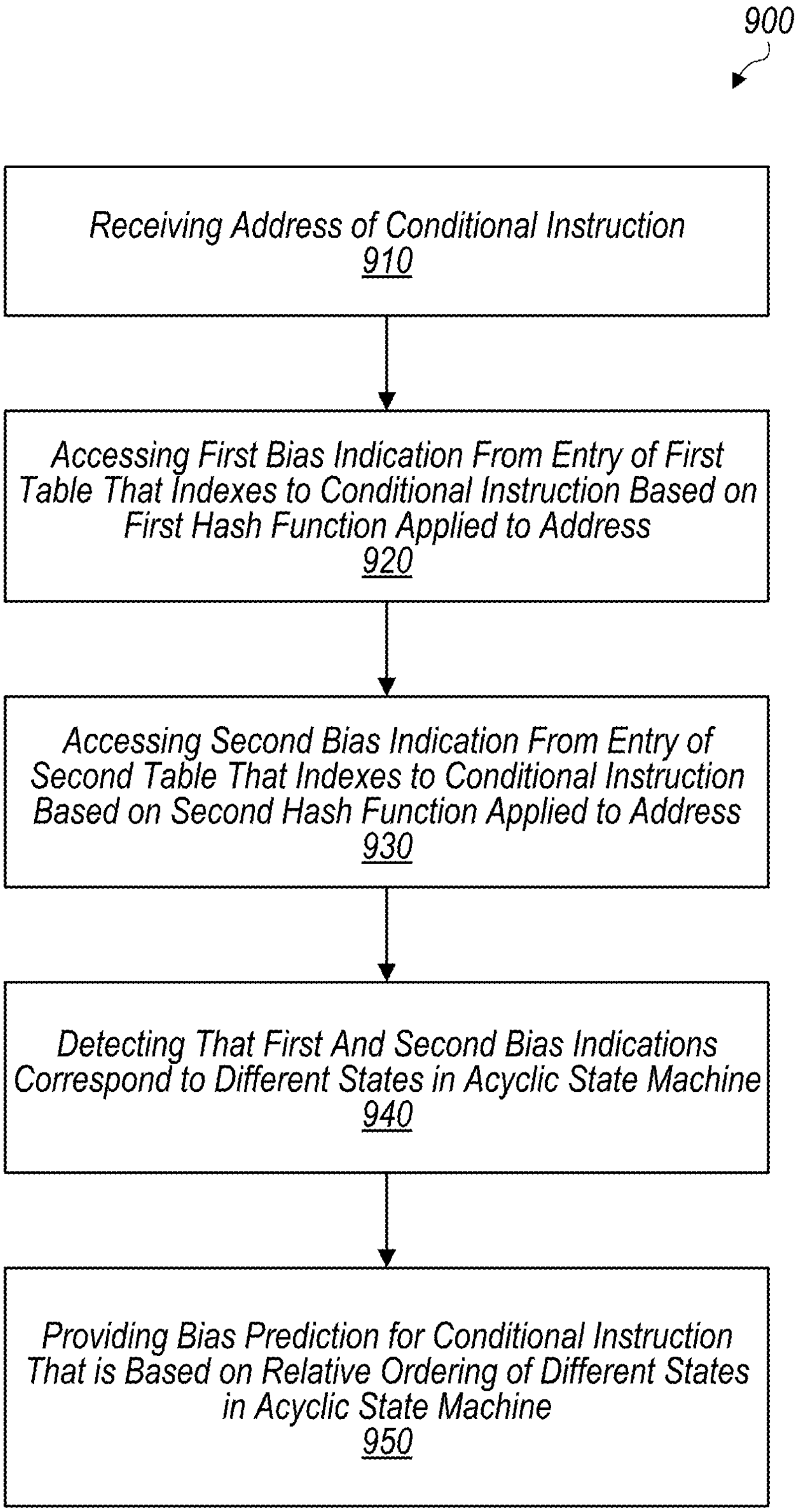

Turning now to FIG. 9, a flow diagram of a method 900 is shown. Method 900 is one embodiment of a method performed by prediction circuitry (e.g., bias prediction circuitry 124) to produce a bias prediction for a conditional instruction. Method 900 may include more or fewer steps than shown—e.g., method 900 may include a step in which the prediction circuitry receives a conditional instruction (or a virtual address of the conditional instruction) from prefetch circuitry (e.g., prefetch circuitry 210).

Method 900 begins in step 910 with the prediction circuitry receiving an address (e.g., a virtual address) of a conditional instruction. In step 920, the prediction circuitry accesses a first bias indication (e.g., a bias indication 410) from an entry (e.g., an entry 400) of a first table (e.g., bias table 126A) that indexes to the conditional instruction based on a first hash function (e.g., hash function 515A) and the address. In step 930, the prediction circuitry accesses a second bias indication from an entry of a second table (e.g., bias table 126B) that indexes to the conditional instruction based on a second hash function (e.g., hash function 515B) and the address.

In step 940, the prediction circuitry detects that the first and second bias indications correspond to different states in an acyclic state machine (e.g., state machine 300). In various embodiments, the acyclic state machine includes an initial state, a bias true state, and a bias false state. The bias true state and the bias false state may correspond to the different states and may be downstream from the initial state. The first and second bias indications may be set based on an outcome associated with a first different conditional instruction that indexes to the entry of the first table and an outcome associated with a second different conditional instruction that indexes to the entry of the second table.

In step 950, the prediction circuitry provides a bias prediction for the conditional instruction that is based on a relative ordering of the different states in the acyclic state machine. The different states may be at different levels in the acyclic state machine, and the bias prediction may be provided based on which state of the different states is most upstream in the acyclic state machine. The different states may be at the same level in the acyclic state machine, and the bias prediction may be provided based on a state that is more upstream in the acyclic state machine than the different states. In various embodiments, the prediction circuitry receives an outcome associated with the conditional instruction and then updates the first and second entries based on the outcome corresponding to a state in the acyclic state machine that is different from the different states corresponding to the first and second bias indications.

Figure 10:
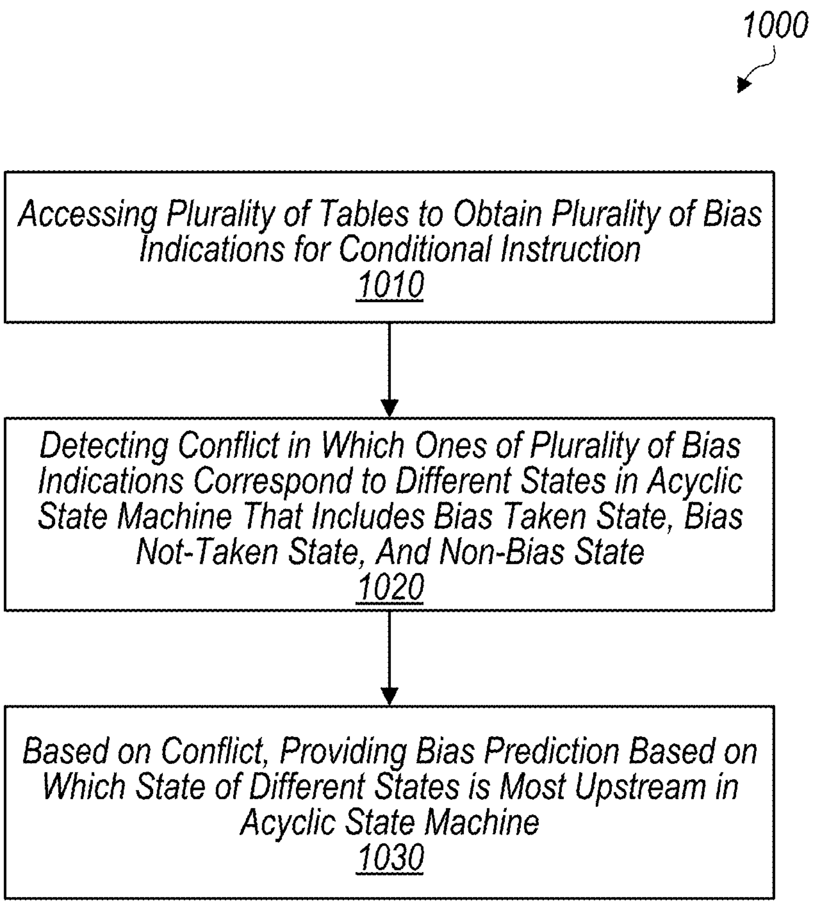

Turning now to FIG. 10, a flow diagram of a method 1000 is shown. Method 1000 is one embodiment of a method performed by bias prediction circuitry (e.g., bias prediction circuitry 124) to produce a bias prediction for a conditional instruction. Method 1000 may include more or fewer steps than shown—e.g., method 1000 may include a step in which the bias prediction circuitry receives a conditional instruction (or a virtual address of the conditional instruction) from prefetch circuitry (e.g., prefetch circuitry 210).

Method 1000 begins in step 1010 with the bias prediction circuitry accessing a plurality of tables (e.g., bias tables 126) to obtain a plurality of bias indications (e.g., bias indications 410) for a conditional instruction. In various embodiments, the bias prediction circuitry provides a bias prediction as to whether the conditional instruction is biased taken, biased not taken, or non-biased. A given bias prediction of biased taken or biased not taken indicates that the bias prediction circuitry predicts that a condition of a given conditional instruction is always true or always false. The plurality of tables may include only two tables, and the bias prediction circuitry may index into the two tables using different hash functions on an address of the conditional instruction.

In step 1020, the bias prediction circuitry detects a conflict in which ones of the plurality of bias indications correspond to different states in an acyclic state machine (e.g., state machine 300) that includes a bias taken state, a bias not-taken state, and a non-bias state. In step 1030, based on the conflict, the bias prediction circuitry provides the bias prediction based on which state of the different states is most upstream in the acyclic state machine. Based on a detection that the different states correspond to a same level in the acyclic state machine, the bias prediction circuitry may provide the bias prediction based on a state that is upstream in the acyclic state machine to the different states. The bias prediction circuitry may be included in a processor (e.g., processor 110). The processor may include fetch and decode circuitry that, responsive to the bias prediction that the conditional instruction is biased taken or biased not taken, uses the bias prediction to determine a target address of the conditional instruction.

The processor may include instruction prediction circuitry that provides an instruction prediction as to whether the condition of the conditional instruction is true or false. The bias prediction from the bias prediction circuitry and the instruction prediction from the instruction prediction circuitry may be provided at different stages of processing of the conditional instruction in the processor. In various embodiments, the bias prediction circuitry receives an outcome associated with the conditional instruction and updates only one of the plurality of tables based on a detection that the outcome corresponds to one of the different states.

Example Device

Figure 11:
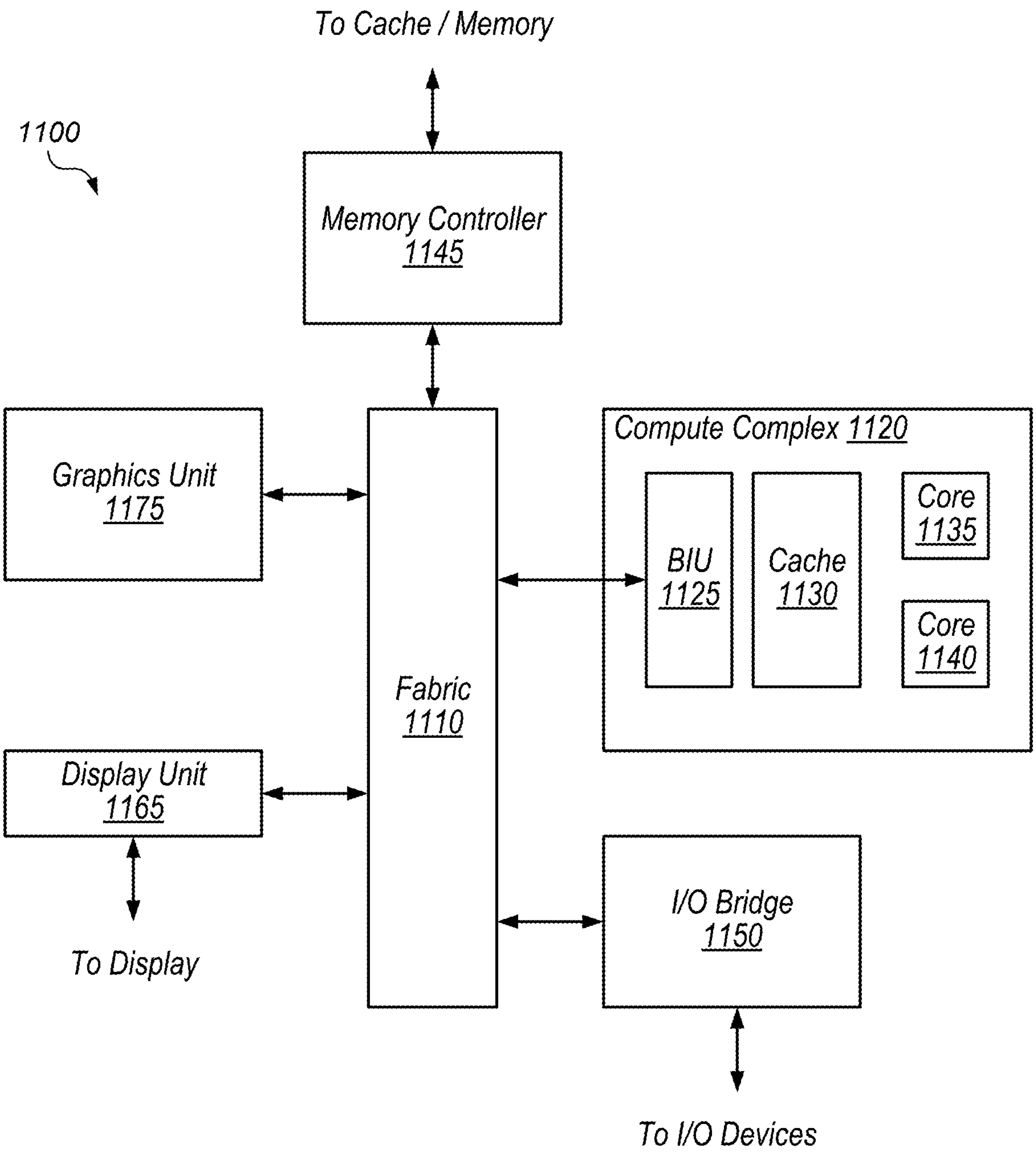
FIG. 11 is a block diagram illustrating one embodiment of a device that includes one or more components described in this disclosure.

Referring now to FIG. 11, a block diagram illustrating an example embodiment of a device 1100 is shown. In some embodiments, elements of device 1100 may be included within a system on a chip. Device 1100 may implement system 100 and therefore device 1100 may implement functionality of components of system 100, such as bias prediction circuitry 124. In some embodiments, device 1100 may be included in a mobile device, which may be battery-powered. Therefore, power consumption by device 1100 may be an important design consideration. In the illustrated embodiment, device 1100 includes fabric 1110, compute complex 1120 input/output (I/O) bridge 1150, cache/memory controller 1145, graphics unit 1175, and display unit 1165. In some embodiments, device 1100 may include other components (not shown) in addition to or in place of the illustrated components, such as video processor encoders and decoders, image processing or recognition elements, computer vision elements, etc.

Fabric 1110 may include various interconnects, buses, MUX's, controllers, etc., and may be configured to facilitate communication between various elements of device 1100. In some embodiments, portions of fabric 1110 may be configured to implement various different communication protocols. In other embodiments, fabric 1110 may implement a single communication protocol and elements coupled to fabric 1110 may convert from the single communication protocol to other communication protocols internally.

In the illustrated embodiment, compute complex 1120 includes bus interface unit (BIU) 1125, cache 1130, and cores 1135 and 1140. In various embodiments, compute complex 1120 may include various numbers of processors, processor cores and caches. For example, compute complex 1120 may include 1, 2, or 4 processor cores, or any other suitable number. In one embodiment, cache 1130 is a set associative L2 cache. In some embodiments, cores 1135 and 1140 may include internal instruction and data caches. In some embodiments, a coherency unit (not shown) in fabric 1110, cache 1130, or elsewhere in device 1100 may be configured to maintain coherency between various caches of device 1100. BIU 1125 may be configured to manage communication between compute complex 1120 and other elements of device 1100. Processor cores such as cores 1135 and 1140 may be configured to execute instructions of a particular instruction set architecture (ISA) which may include operating system instructions and user application instructions. These instructions may be stored in computer readable medium such as a memory coupled to memory controller 1145 discussed below.

As used herein, the term "coupled to" may indicate one or more connections between elements, and a coupling may include intervening elements. For example, in FIG. 11, graphics unit 1175 may be described as "coupled to" a memory through fabric 1110 and cache/memory controller 1145. In contrast, in the illustrated embodiment of FIG. 11, graphics unit 1175 is "directly coupled" to fabric 1110 because there are no intervening elements.

Cache/memory controller 1145 may be configured to manage transfer of data between fabric 1110 and one or more caches and memories. For example, cache/memory controller 1145 may be coupled to an L3 cache, which may in turn be coupled to a system memory. In other embodiments, cache/memory controller 1145 may be directly coupled to a memory. In some embodiments, cache/memory controller 1145 may include one or more internal caches. Memory coupled to controller 1145 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 1145 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 1120 to cause the computing device to perform functionality described herein.

Graphics unit 1175 may include one or more processors, e.g., one or more graphics processing units (GPUs). Graphics unit 1175 may receive graphics-oriented instructions, such as OPENGL®, Metal®, or DIRECT3D® instructions, for example. Graphics unit 1175 may execute specialized GPU instructions or perform other operations based on the received graphics-oriented instructions. Graphics unit 1175 may generally be configured to process large blocks of data in parallel and may build images in a frame buffer for output to a display, which may be included in the device or may be a separate device. Graphics unit 1175 may include transform, lighting, triangle, and rendering engines in one or more graphics processing pipelines. Graphics unit 1175 may output pixel information for display images. Graphics unit 1175, in various embodiments, may include programmable shader circuitry which may include highly parallel execution cores configured to execute graphics programs, which may include pixel tasks, vertex tasks, and compute tasks (which may or may not be graphics-related).

Display unit 1165 may be configured to read data from a frame buffer and provide a stream of pixel values for display. Display unit 1165 may be configured as a display pipeline in some embodiments. Additionally, display unit 1165 may be configured to blend multiple frames to produce an output frame. Further, display unit 1165 may include one or more interfaces (e.g., MIPI® or embedded display port (eDP)) for coupling to a user display (e.g., a touchscreen or an external display).

I/O bridge 1150 may include various elements configured to implement: universal serial bus (USB) communications, security, audio, and low-power always-on functionality, for example. I/O bridge 1150 may also include interfaces such as pulse-width modulation (PWM), general-purpose input/output (GPIO), serial peripheral interface (SPI), and inter-integrated circuit (I2C), for example. Various types of peripherals and devices may be coupled to device 1100 via I/O bridge 1150.

In some embodiments, device 1100 includes network interface circuitry (not explicitly shown), which may be connected to fabric 1110 or I/O bridge 1150. The network interface circuitry may be configured to communicate via various networks, which may be wired, wireless, or both. For example, the network interface circuitry may be configured to communicate via a wired local area network, a wireless local area network (e.g., via Wi-Fi™) or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 1100 with connectivity to various types of other devices and networks.

Example Applications

Figure 12:
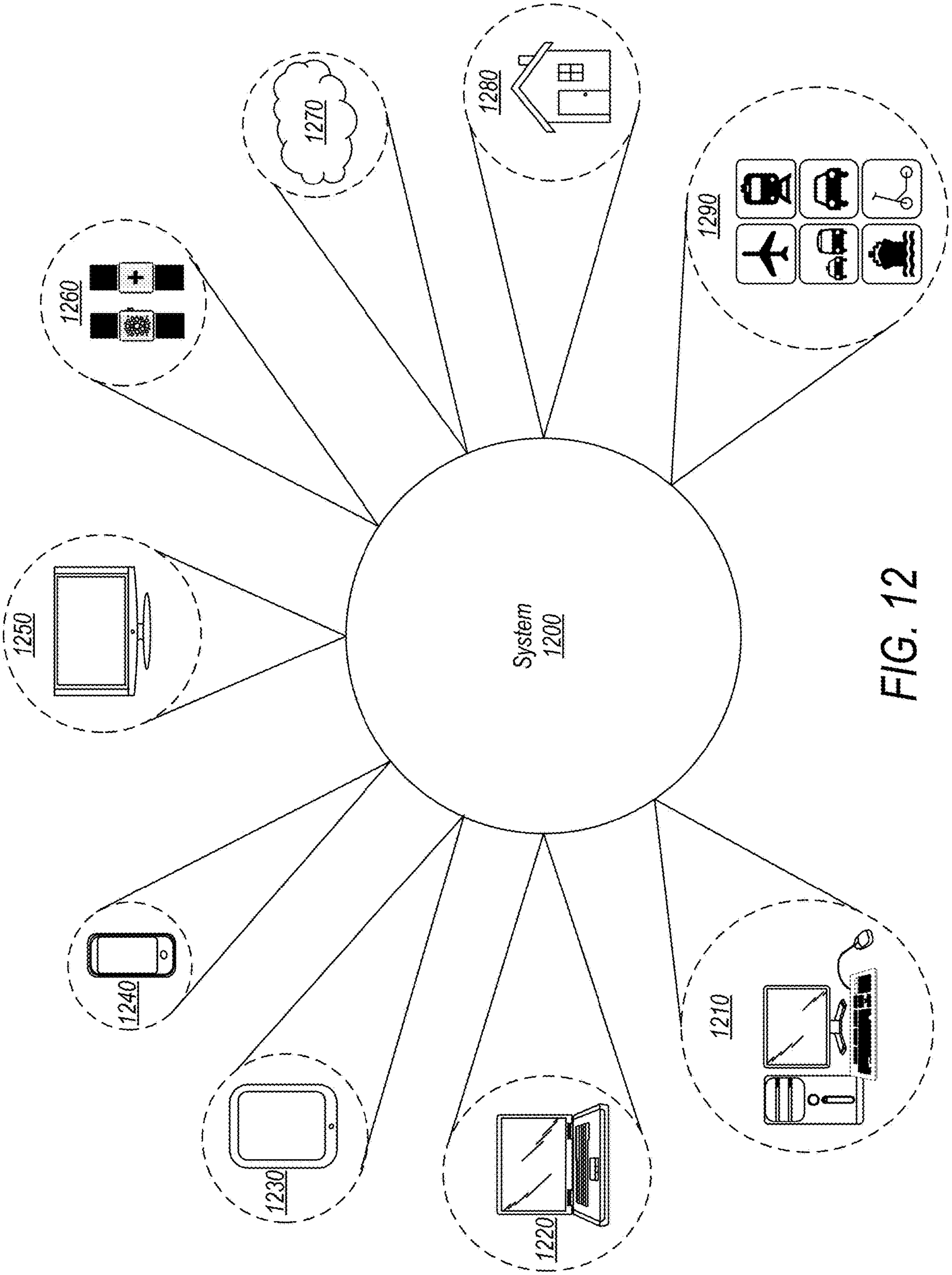
FIG. 12 is a block diagram illustrating one embodiment of a system (that includes one or more components described in this disclosure) used in various types of applications.

Turning now to FIG. 12, various types of systems that may include any of the circuits, devices, or system discussed above. System or device 1200, which may incorporate or otherwise utilize one or more of the techniques described herein, may be utilized in a wide range of areas. For example, system or device 1200 may be utilized as part of the hardware of systems such as a desktop computer 1210, laptop computer 1220, tablet computer 1230, cellular or mobile phone 1240, or television 1250 (or set-top box coupled to a television).

Similarly, disclosed elements may be utilized in a wearable device 1260, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1200 may also be used in various other contexts. For example, system or device 1200 may be utilized in the context of a server computer system, such as a dedicated server or on shared hardware that implements a cloud-based service 1270. Still further, system or device 1200 may be implemented in a wide range of specialized everyday devices, including devices 1280 commonly found in the home such as refrigerators, thermostats, security cameras, etc. The interconnection of such devices is often referred to as the "Internet of Things" (IoT). Elements may also be implemented in various modes of transportation. For example, system or device 1200 could be employed in the control systems, guidance systems, entertainment systems, etc. of various types of vehicles 1290.

The applications illustrated in FIG. 12 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 13:
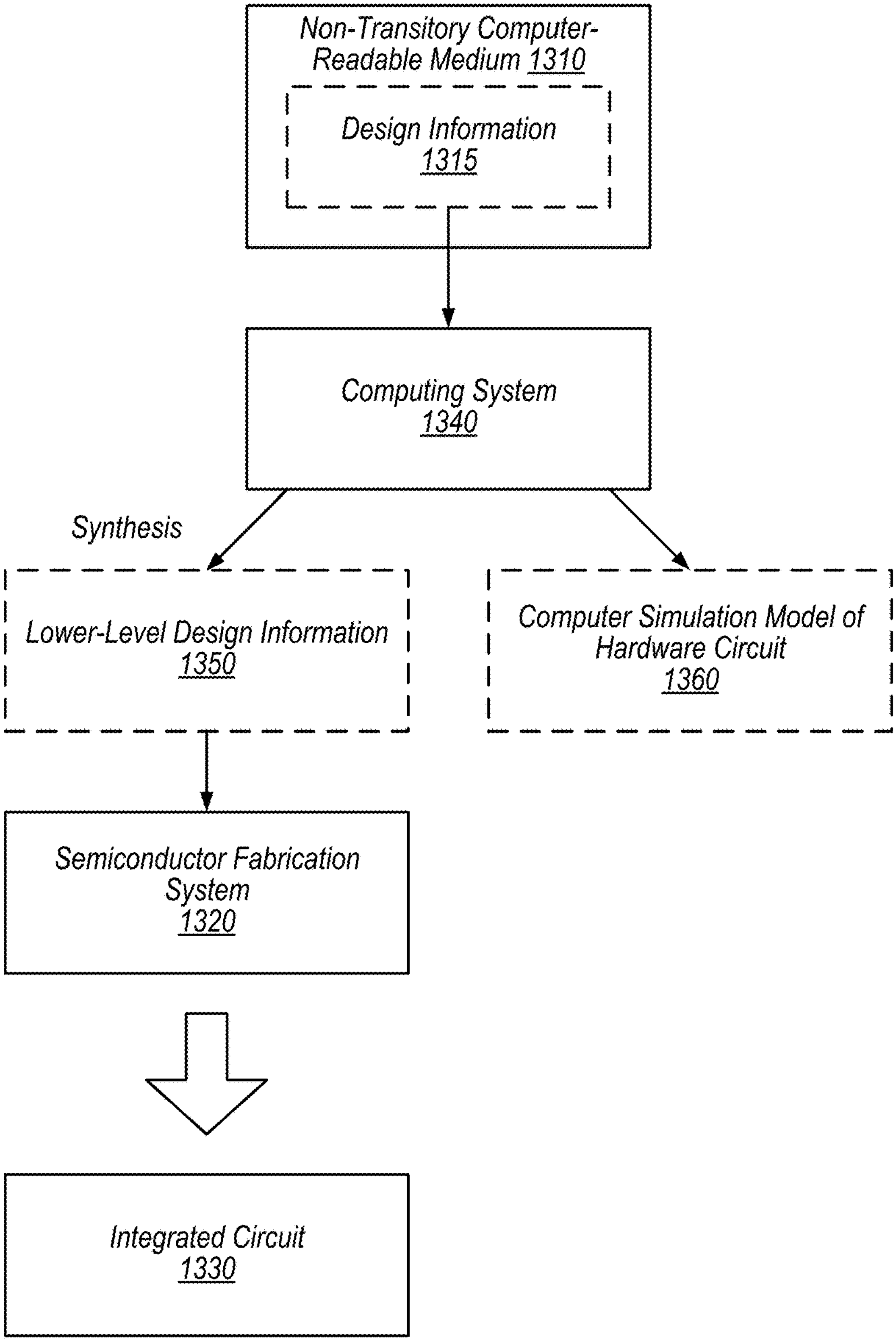
FIG. 13 is a block diagram illustrating one embodiment of a process of fabricating an integrated circuit that includes one or more components described in this disclosure.

FIG. 13 is a block diagram illustrating an example non-transitory computer-readable storage medium that stores circuit design information, according to some embodiments. In the illustrated embodiment, computing system 1340 is configured to process the design information. This may include executing instructions included in the design information, interpreting instructions included in the design information, compiling, transforming, or otherwise updating the design information, etc. Therefore, the design information controls computing system 1340 (e.g., by programming computing system 1340) to perform various operations discussed below, in some embodiments.

In the illustrated example, computing system 1340 processes the design information to generate both a computer simulation model of a hardware circuit 1360 and lower-level design information 1350. In other embodiments, computing system 1340 may generate only one of these outputs, may generate other outputs based on the design information, or both. Regarding the computing simulation, computing system 1340 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1340 also processes the design information to generate lower-level design information 1350 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1350 (potentially among other inputs), semiconductor fabrication system 1320 is configured to fabricate an integrated circuit 1330 (which may correspond to functionality of the simulation model 1360). Note that computing system 1340 may generate different simulation models based on design information at various levels of description, including information 1350, 1315, and so on. The data representing design information 1350 and model 1360 may be stored on medium 1310 or on one or more other media.

In some embodiments, the lower-level design information 1350 controls (e.g., programs) the semiconductor fabrication system 1320 to fabricate the integrated circuit 1330. Thus, when processed by the fabrication system, the design information may program the fabrication system to fabricate a circuit that includes various circuitry disclosed herein.

Non-transitory computer-readable storage medium 1310, may comprise any of various appropriate types of memory devices or storage devices. Non-transitory computer-readable storage medium 1310 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1310 may include other types of non-transitory memory as well or combinations thereof. Accordingly, non-transitory computer-readable storage medium 1310 may include two or more memory media; such media may reside in different locations—for example, in different computer systems that are connected over a network.

Design information 1315 may be specified using any of various appropriate computer languages, including hardware description languages such as, without limitation: VHDL, Verilog, SystemC, SystemVerilog, RHDL, M, MyHDL, etc. The format of various design information may be recognized by one or more applications executed by computing system 1340, semiconductor fabrication system 1320, or both. In some embodiments, design information may also include one or more cell libraries that specify the synthesis, layout, or both of integrated circuit 1330. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1330 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1320 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1320 may also be configured to perform various testing of fabricated circuits for correct operation.

In various embodiments, integrated circuit 1330 and model 1360 are configured to operate according to a circuit design specified by design information 1315, which may include performing any of the functionality described herein. For example, integrated circuit 1330 may include any of various elements shown in FIGS. 1-5 and 7, such as bias prediction circuitry 124. Further, integrated circuit 1330 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1320 to fabricate integrated circuit 1330.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:

a processor that includes:

prediction circuitry configured to provide a bias prediction as to whether a conditional instruction is biased to a particular outcome that affects a control flow for the conditional instruction, wherein the prediction circuitry is configured to:

access a plurality of tables to obtain a plurality of bias indications for the conditional instruction, wherein a given one of the plurality of bias indications corresponds to a state in an acyclic state machine, and the plurality of tables are subject to destructive aliasing that permits multiple conditional instructions to map to a same entry in one or more of the plurality of tables;

detect a conflict in which the plurality of bias indications include different bias indications corresponding to different states in the acyclic state machine; and provide the bias prediction based on a resolution of the conflict that is determined based on a relative hierarchical ordering of the different states in the acyclic state machine; and execution circuitry configured to:

execute the conditional instruction based on the bias prediction; and provide, to the prediction circuitry, an evaluation indication that indicates whether the bias prediction is a misprediction.

2. The apparatus of claim 1, wherein the prediction circuitry is configured to:

determine, to resolve the conflict, which state of the different states corresponding to the different bias indications is most upstream in the acyclic state machine, wherein the bias prediction is provided based on the determined state.

3. The apparatus of claim 1, wherein the prediction circuitry is configured to:

based on a detection that the different states corresponding to the different bias indications are not upstream and not downstream relative to each other in the acyclic state machine, determine, to resolve the conflict, a state that is upstream to the different states, wherein the bias prediction is provided based on the determined state.

4. The apparatus of claim 1, wherein the plurality of bias indications includes a first bias indication and a second bias indication, wherein the prediction circuitry is configured to change the first bias indication in response to a detection, based on the evaluation indication, that the first bias indication is a misprediction independent of whether the second bias indication is a misprediction.

5. The apparatus of claim 4, wherein the prediction circuitry is configured to change the first bias indication without performing a read-modify-write operation.

6. The apparatus of claim 1, wherein the acyclic state machine includes an initial state, a bias taken state, a bias not-taken state, and a non-bias state, wherein the bias taken state and the bias not-taken state are downstream from the initial state, and the non-bias state is downstream from the bias taken state and the bias not-taken state.

7. The apparatus of claim 1, wherein the plurality of tables includes only two tables.

8. The apparatus of claim 1, wherein the prediction circuitry is configured to perform a reset operation to reset all bias indications in the plurality of tables to correspond to an initial state in the acyclic state machine.

9. The apparatus of claim 1, wherein the prediction circuitry is included in fetch and decode circuitry configured to recode the conditional instruction in an instruction cache based on the bias prediction indicating that the conditional instruction is biased to the particular outcome.

10. A method, comprising:

receiving, by prediction circuitry of a processor, an address of a conditional instruction;

accessing, by the prediction circuitry, a first bias indication from a first entry of a first table that indexes to the conditional instruction based on a first hash function applied to the address;

accessing, by the prediction circuitry, a second bias indication from a second entry of a second table that indexes to the conditional instruction based on a second hash function applied to the address;

detecting, by the prediction circuitry, a conflict in which the first and second bias indications correspond to different states in an acyclic state machine; and providing, by the prediction circuitry, a bias prediction for the conditional instruction that is based on a resolution of the conflict that is determined based on a relative hierarchical ordering of the different states in the acyclic state machine.

11. The method of claim 10, wherein the different states are at different levels in the acyclic state machine, and wherein the bias prediction is provided based on which state of the different states is most upstream in the acyclic state machine.

12. The method of claim 10, wherein the different states are at a same level in the acyclic state machine, and wherein the bias prediction is provided based on a state that is more upstream in the acyclic state machine than the different states.

13. The method of claim 12, wherein the first and second bias indications are set based on outcomes associated with different conditional instructions that index to the first and second entries, respectively.

14. The method of claim 12, wherein the acyclic state machine includes an initial state, a bias true state, and a bias false state, wherein the bias true state and the bias false state correspond to the different states and are downstream from the initial state, and wherein the bias prediction is provided based on the initial state.

15. The method of claim 10, further comprising:

receiving, by the prediction circuitry, an outcome associated with the conditional instruction; and updating the first and second entries based on the outcome corresponding to a state in the acyclic state machine that is different from the different states corresponding to the first and second bias indications.

16. A system, comprising:

a processor that includes:

bias prediction circuitry configured to provide a bias prediction as to whether a conditional instruction is biased taken, biased not taken, or non-biased, wherein a given bias prediction of biased taken or biased not taken indicates that the bias prediction circuitry predicts that a condition of a given conditional instruction is always true or always false, wherein the bias prediction circuitry is configured to:

access a plurality of tables to obtain a respective plurality of bias indications for the conditional instruction;

detect a conflict in which ones of the plurality of bias indications correspond to different states in an acyclic state machine that includes a bias taken state, a bias not-taken state, and a non-bias state;

provide the bias prediction based on a resolution of the conflict that is determined based on which state of the different states is most upstream in the acyclic state machine; and fetch and decode circuitry configured to, responsive to the bias prediction that the conditional instruction is biased taken or biased not taken, use the bias prediction to determine a target address of the conditional instruction.

17. The system of claim 16, wherein the bias prediction circuitry is configured to:

based on a detection that the different states correspond to a same level in the acyclic state machine, provide the bias prediction based on a state that is upstream in the acyclic state machine to the different states.

18. The system of claim 16, wherein the bias prediction circuitry is configured to:

receive an outcome associated with the conditional instruction; and change a bias indication in only one of the plurality of tables based on a detection that the outcome corresponds to one of the different states.

19. The system of claim 16, wherein the plurality of tables includes only two tables, and wherein the bias prediction circuitry is configured to index into the two tables using different hash functions on an address of the conditional instruction.

20. The system of claim 16, wherein the processor includes:

instruction prediction circuitry configured to provide an instruction prediction as to whether the condition of the conditional instruction is true or false, wherein the bias prediction from the bias prediction circuitry and the instruction prediction from the instruction prediction circuitry are provided at different stages of processing of the conditional instruction in the processor.

* * * * *